US008250616B2

(12) United States Patent
Davis et al.

(10) Patent No.: US 8,250,616 B2
(45) Date of Patent: Aug. 21, 2012

(54) DISTRIBUTED LIVE MULTIMEDIA CAPTURE, FEEDBACK MECHANISM, AND NETWORK

(75) Inventors: Marc Davis, San Francisco, CA (US); Joseph O'Sullivan, Oakland, CA (US); Chris W. Higgins, Portland, OR (US); Ron Martinez, San Francisco, CA (US); Athellina Athsani, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 842 days.

(21) Appl. No.: 11/864,769

(22) Filed: Sep. 28, 2007

(65) Prior Publication Data

US 2009/0089294 A1 Apr. 2, 2009

(51) Int. Cl.
*H04N 7/173* (2011.01)
(52) U.S. Cl. .................................. 725/87; 725/97
(58) Field of Classification Search .................... None
See application file for complete search history.

(56) References Cited

U.S. PATENT DOCUMENTS

| | | | |
|---|---|---|---|
| 6,556,989 B1 | 4/2003 | Naimark et al. | |
| 6,564,380 B1 | 5/2003 | Murphy | |
| 6,721,744 B1 | 4/2004 | Naimark et al. | |
| 6,757,682 B1 | 6/2004 | Naimark et al. | |
| 6,947,966 B1* | 9/2005 | Oko et al. | 709/203 |
| 7,849,407 B2* | 12/2010 | Jung et al. | 715/734 |
| 2002/0188943 A1 | 12/2002 | Freeman et al. | |
| 2002/0194585 A1 | 12/2002 | Connelly | |
| 2003/0018521 A1 | 1/2003 | Kraft et al. | |
| 2004/0032495 A1 | 2/2004 | Ortiz | |
| 2004/0210923 A1* | 10/2004 | Hudgeons et al. | 725/24 |
| 2005/0130584 A1* | 6/2005 | Dowling et al. | 455/3.06 |
| 2005/0165779 A1 | 7/2005 | Kaiser et al. | |
| 2005/0177416 A1 | 8/2005 | Linden | |
| 2006/0104600 A1 | 5/2006 | Abrams | |
| 2006/0174297 A1 | 8/2006 | Anderson et al. | |
| 2006/0184983 A1 | 8/2006 | Casey | |
| 2006/0282389 A1 | 12/2006 | Gupte | |
| 2007/0002129 A1* | 1/2007 | Benco et al. | 348/14.02 |
| 2007/0022447 A1 | 1/2007 | Arseneau et al. | |
| 2007/0061331 A1 | 3/2007 | Ramer et al. | |
| 2007/0061336 A1 | 3/2007 | Ramer et al. | |
| 2007/0067304 A1 | 3/2007 | Ives | |
| 2007/0073585 A1 | 3/2007 | Apple et al. | |

(Continued)

OTHER PUBLICATIONS

"Peer-to-Peer Live Streaming," by Meier, Remo. IN: Master Thesis, Dept. of Computer Science, Swiss Federal Institute of Technology, Zurich (Summer, 2006) Available at: http://disco.ethz.ch/theses/ss06/pulsar_report.pdf.*

(Continued)

*Primary Examiner* — Neveen Abel Jalil
*Assistant Examiner* — Daniel Kinsaul
(74) *Attorney, Agent, or Firm* — Martine Penilla Group, LLP

(57) ABSTRACT

Methods and systems for processing multimedia content captured from a plurality of locations via one or more capturing devices include obtaining multimedia content from one or more capturing devices. The capturing devices identify a type of content being captured and/or location of capture. An interest type for multimedia content is obtained from a consuming user. The multimedia content from the capturing devices are searched based on the interest type of the consuming user. A subset of the multimedia content conforming to the interest type is presented in substantial real-time at the receiving devices of the consuming users. Feedback regarding the presented multimedia content is obtained from consuming users and communicated to the capturing devices in substantial real-time so as to influence future capture of multimedia content.

25 Claims, 26 Drawing Sheets

U.S. PATENT DOCUMENTS

| | | | |
|---|---|---|---|
| 2007/0094705 A1 | 4/2007 | Crowley et al. | |
| 2007/0097212 A1* | 5/2007 | Farneman | 348/143 |
| 2007/0130015 A1 | 6/2007 | Starr et al. | |
| 2007/0174624 A1 | 7/2007 | Wolosewicz et al. | |
| 2007/0197247 A1 | 8/2007 | Inselberg | |
| 2007/0204310 A1 | 8/2007 | Hua et al. | |
| 2007/0245243 A1* | 10/2007 | Lanza et al. | 715/723 |
| 2007/0250445 A1 | 10/2007 | Ache | |
| 2007/0250901 A1* | 10/2007 | McIntire et al. | 725/146 |
| 2007/0276807 A1 | 11/2007 | Chen et al. | |
| 2007/0286169 A1 | 12/2007 | Roman | |
| 2008/0015881 A1* | 1/2008 | Shankar | 705/1 |
| 2008/0079573 A1 | 4/2008 | Bloebaum et al. | 340/568.1 |
| 2008/0109306 A1* | 5/2008 | Maigret et al. | 705/14 |
| 2008/0112315 A1* | 5/2008 | Hu et al. | 370/230 |
| 2008/0147487 A1 | 6/2008 | Hirshberg | |
| 2008/0208692 A1 | 8/2008 | Garaventi et al. | |
| 2008/0219658 A1* | 9/2008 | Keane et al. | 396/429 |
| 2008/0221989 A1 | 9/2008 | Messer et al. | |
| 2008/0250458 A1 | 10/2008 | Roman | |
| 2008/0271098 A1 | 10/2008 | Kalaboukis | |
| 2008/0307053 A1 | 12/2008 | Mitnick et al. | |
| 2009/0063419 A1* | 3/2009 | Nurminen et al. | 707/3 |
| 2009/0144624 A1 | 6/2009 | Barnes, Jr. | |
| 2009/0262975 A1 | 10/2009 | Rhoads et al. | |

OTHER PUBLICATIONS

Ken Goldberg, Steve Bui, Billy Chen, Bobak Farzin, Jacob Heitler, Derek Poon, Rory Solomon, and Gordon Smtih, *Collaborative Teleoperation on the Internet*, IEEE ICRA 2000, San Francisco, CA, Apr. 2000, (pp. 1-6).

Dezhen Song and Ken Goldberg, *ShareCam Part I: Interface, System Architecture, and Implementation of a Collaboratively Controlled Robotic Webcam*, IEEE/RSJ International Conference on Robots and Systems, Oct. 2003, (7 pages).

Dezhen Song, Ken Goldberg, and Anatoly Pashkevich, *ShareCam Part II: Approximate and Distributed Algorithms for a Collaboratively Controlled Robotic Webcam*, IEEE/RSJ International Conference on Robots and Systems, Oct. 2003, (7 pages).

Dezhen Song, A. Frank Van Der Stappen, and Ken Goldberg, *Exact and Distributed Algorithms for Collaborative Camera Control*, Fifth Workshop on the Algorithmic Foundations of Robotics, Nice, France, Dec. 2002, (pp. 1-17).

Ken Goldberg, Dezhen Song and Anthony Levandowski, *Collaborative Teleoperation using Networked Spatial Dynamic Voting*, Proceedings of the IEEE, Special issue on Networked Robots, Mar. 2003, (pp. 430-439).

K. Goldberg, D. Song, Y. Khor, D. Pescovitz, A. Levandowski, J. Himmelstein, J. Shih, A. Ho, E. Paulos, J. Donath, *Collaborative Online Teleoperation with Spatial Dynamic Voting and a Human "Tele-Actor"*, IEEE International Conference on Robotics and Automation, May 2002, (6 pages).

K. Goldberg and M. Mascha and S Gentner and N. Rothenberg and C. Sutter and J. Wiegley, *Desktop Teleoperation via the World Wide Web*, IEEE International Conference on Robotics and Automation, May 1995. (pp. 654-659 vol. 1.).

Ustream—screenshots taken from the Internet Archives for May 27, 2007 and Jul. 13, 2007. Available at: http://web.archive.org/web 20070527182440/http://ustream.tv/http://web.archive.org/web 20070713081855/ustream.tv/faq.

* cited by examiner

Live CU Viewer Statistic and status control

Live CU to GU Feedback

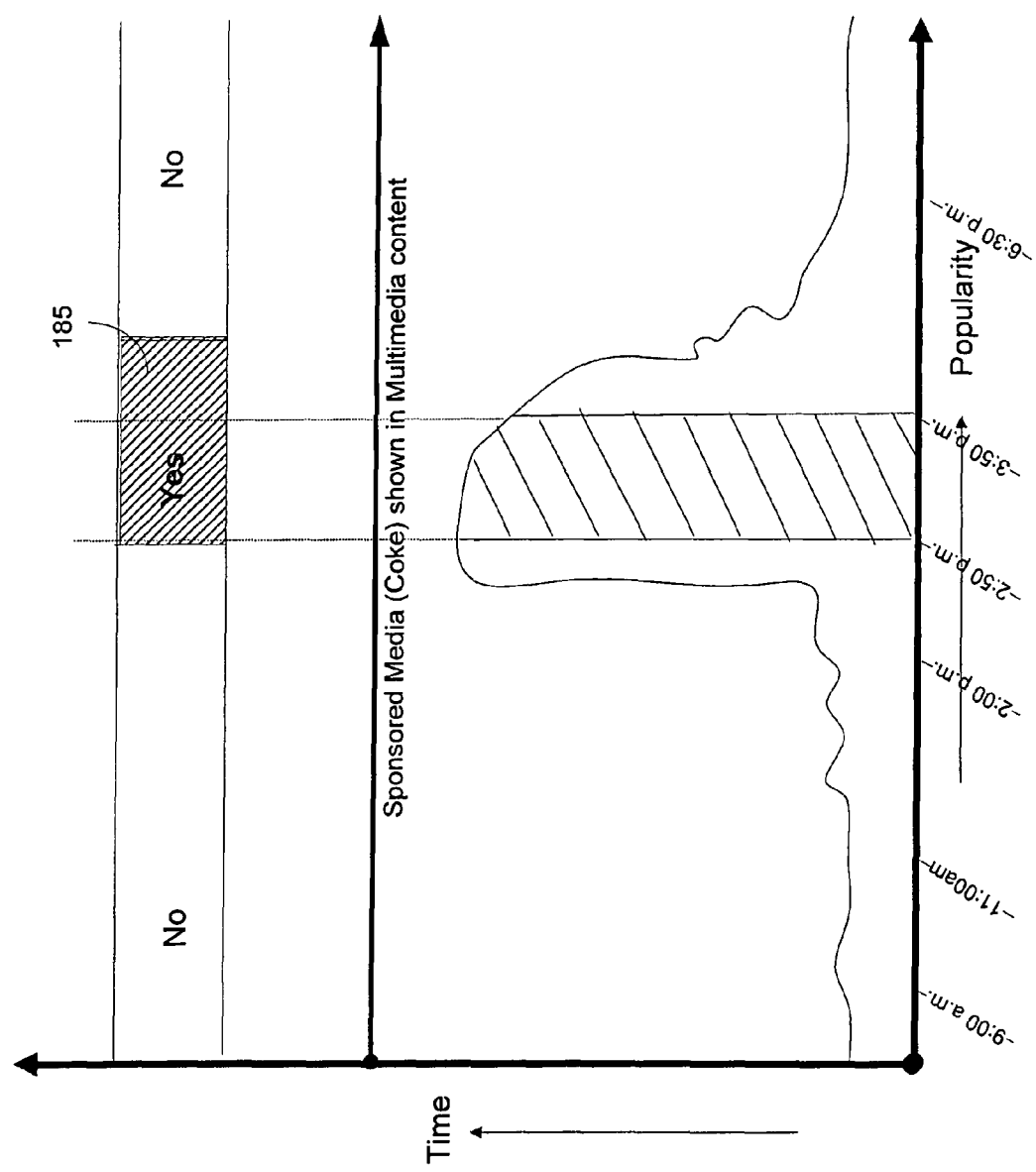

DISTRIBUTED LIVE MULTIMEDIA CAPTURE, FEEDBACK MECHANISM, AND NETWORK

CROSS REFERENCE TO RELATED APPLICATIONS

This application is related to U.S. patent application Ser. No. 11/864,862, filed on Sep. 28, 2007, and entitled "DISTRIBUTED LIVE MULTIMEDIA SWITCHING MECHANISM AND NETWORK" and U.S. patent application Ser. No. 11/864,864, filed on Sep. 28, 2007, and entitled "DISTRIBUTED LIVE MULTIMEDIA MONETIZATION MECHANISM AND NETWORK."

BACKGROUND

1. Field of the Invention

This invention relates to providing live multimedia content for specific events or topics and is specifically related to systems that provide customized live multimedia content using a network of capturing providers with interactive feedback from a network of users of the multimedia content.

2. Description of the Related Art

A great deal of multimedia information is generated when people use electronic multimedia capturing devices such as mobile phones, digital cameras, web cameras, etc. The information related to events or data captured such as location, applications used, social network, physical and online locations visited, to name a few, could be used to provide useful services and valuable information to end users, as well as provide commercial opportunities to advertisers and retailers. Traditionally, such information was managed and provided by service content providers based on the content provider's view of what needs to be rendered, where to render, when to receive and render and who to engage in order to capture the content to be rendered. Additionally, such information was provided based on the content provider's interpretation of the event/topic. This results in a very narrow representation of an event or data being captured and rendered. For example, television news channels, especially during live broadcasts, do not provide viewing users (consumers) with an option of directing what should be captured, how it should be captured, nor when or where to capture. If the user finds certain news casts interesting, then a user will spend the time to view the content. Otherwise, the user is forced to channel surf until something interesting appears. Thus, a consumer has no control over what exactly should be covered or captured and must rely on the content provider to relay the appropriate information related to an event/topic.

It is in this context that embodiments of the invention arise.

SUMMARY OF THE INVENTION

The embodiments of the invention include a Network for interconnecting multiple live multimedia capturing users to multiple multimedia consuming users in real-time that enables the consuming users to provide real-time interactive multimedia feedback to the capturing users to direct, personalize and otherwise control captured multimedia content and/or style including means for producing, mixing and re-mixing multiple streams into a composite stream.

Several distinct embodiments are presented herein as examples, including methods, systems, computer readable media, program instructions, and method-system combinations. In one embodiment, a system includes hardware and software that enables management and acquisition, indexing and distribution, and personalization and consumption of live multimedia content by creating a distributed real-time Network that can be searched, filtered and dynamically managed to change from one live multimedia feed to another depending on topic, capturing or consuming Users preferences, popularity, importance and interests of a user, feedback from the site of capture such as the location, time, and/or collocated people, objects, and/or events occurring and/or likely to occur at the site of capture, and/or the person and/or organization operating the capture device, or organized into channels or interactive environments by the Network operator for user consumption. The system and method enables linking of a multiplicity of globally dispersed live content capturing devices, and enabling consuming users to pick from many available live feeds streaming from the live content capturing devices as well as providing real-time feedback from the consuming users to the capturing users based upon the consuming users' explicit and implicit feedback. The content can be searched, switched or filtered for specific events, topics, interests, locations, mapped locations, persons, groups, things, themes, genre, etc. Consuming users may personalize the live feeds that they are viewing by explicit choices of topic, event, or capturing or mixing users, or the consuming users may browse currently available feeds based upon personalized search preferences. Once the consuming user focuses on a particular topic, the number of live content capturing devices will start to become more related, so as to begin the paring down to the select few live content capturing devices (and their live content feeds), which are most contextually and interest relevant to the user.

In one embodiment, one particular consuming user may focus on a particular live event, and based on the number of content capturing devices present at the live event, the consuming user can select one or more capturing devices covering varied angles of the live event to enable viewing of the live event from the most desirable view, angle or perspective. An aspect of the invention also enables live and dynamic feedback to the live content capturing users. The live feedback can be in many forms, including direct device feedback, text feedback, audio feedback, tactile feedback, graphical feedback, community rating feedback, live popularity feedback of the content being captured, or any combinations thereof. To provide a good understanding of the underlying disclosure, several distinct embodiments of the present invention are described below.

In one embodiment, a method for processing multimedia content captured from a plurality of locations via one or more capturing devices is disclosed. The method includes obtaining multimedia content from one or more capturing devices. The capturing devices identify a type of content being captured or location and/or time of capture, and/or collocated people, objects, and/or events at the site of capture, and/or the person and/or organization operating the capture device. The method further includes enabling search of the multimedia content and presenting streams of the multimedia content conforming to the search at the receiving devices. The method further includes enabling substantial real-time feedback from the receiving devices to one or more capturing devices that provide the streams of multimedia content. The substantial real-time feedback is configured to influence actions taken at the capturing devices during capture which serve to modify the streams of the multimedia content.

In another embodiment, a method for managing multimedia content capture and access is provided. The method includes obtaining multimedia content from one or more capturing devices. The capturing devices identify a type of content being captured or location and/or time of capture, and/or collocated people, objects, and/or events at the site of capture, and/or the person and/or organization operating the capture device. The method further includes obtaining an interest type for multimedia content from a consuming user and searching the multimedia content for a subset of multimedia content based on the interest type of the consuming user. The method includes presenting the searched subset that defines the multimedia content to receiving devices. The method includes obtaining feedback regarding the multimedia content from consuming users that have access to the receiving devices and communicating feedback in substantial real-time to the capturing devices so as to influence future capture of multimedia content.

In yet another embodiment, a method for managing multimedia content capture and access is disclosed. The method includes obtaining multimedia content from one or more capturing devices. The capturing devices identify a type of content being captured or location and/or time of capture, and/or collocated people, objects, and/or events at the site of capture, and/or the person and/or organization operating the capture device. The method further includes obtaining an interest type for multimedia content from a consuming user and searching the multimedia content for a subset of multimedia content based on the interest type of the consuming user. The method further includes presenting the searched subset of the multimedia content to receiving devices. The multimedia content is defined by the searched subset that is being dynamically updated in substantial real-time based on changes in the multimedia content obtained from the capturing devices. The method further includes obtaining feedback regarding the multimedia content from consuming users that have access to the receiving devices and communicating the feedback to the capturing devices wherein the feedback is presented to the capturing devices in substantial real-time.

In another embodiment, a method for managing interactive multimedia content is disclosed. The method includes receiving multimedia content at a feedback engine wherein the multimedia content is obtained from capturing devices associated with one or more generating users. Each of the capturing devices is communicatively connected to the feedback engine and configured to capture and transmit the multimedia content in substantial real-time over a communication network. The method further includes processing the multimedia content by the feedback engine. The method includes providing access for the multimedia content to the receiving devices of consuming users in substantial real-time. Each of the receiving devices is in communication with the feedback engine over the communication network. The method further includes receiving feedback about or from one or more of the consuming users. The feedback is being processed by the feedback engine in substantial real-time. The method further includes presenting certain multimedia content to the receiving devices based on search preference, such that each of the consuming users is presented with a dynamically changing subset of the plurality of multimedia content based on changes in content obtained from the plurality of capturing devices and based on the search preference.

In another embodiment, a system for managing interactive multimedia content is disclosed. The system includes a plurality of capturing devices handled by one or more generating users. Each of the plurality of capturing devices is configured to capture and transmit multimedia content in substantial real-time over a communication network. The system further includes a plurality of receiving devices associated with one or more consuming users. Each of the plurality of receiving devices configured to receive the multimedia content in substantial real-time over the communication network and to provide feedback in substantial real-time. The system further includes a feedback engine communicatively connected to the plurality of capturing devices and the plurality of receiving devices. The feedback engine includes a stream management module and a feedback management module, wherein the stream management module is configured to process requests and multimedia content by at least one of validating, retrieving, indexing, formatting or presenting multimedia content to the receiving devices based on search preference and the feedback management module is configured to instrument rendering of multimedia content at the receiving devices, and one of gather, review, index, prioritize or publish feedback to the appropriate capturing devices, such that each of the receiving devices is presented with a dynamically changing subset of the multimedia content based on changes in content obtained over time from the plurality of capturing devices and based on the search preference.

In another embodiment, a computer readable medium including program instructions for operating a computing system to process multimedia content captured from a plurality of locations via one or more capturing devices is disclosed. The computer readable media includes program instructions for obtaining multimedia content from one or more capturing devices. The capturing devices identify a type of content being captured or location of capture. The computer readable media further includes program instructions for enabling search of the multimedia content and for presenting streams of the multimedia content conforming to the search at the receiving devices. The computer readable media further includes program instructions for enabling substantial real-time feedback from the receiving devices to one or more capturing devices that provide the streams of multimedia content. The substantial real-time feedback is configured to influence actions taken at the capturing devices during capture, the influenced actions serving to modify the streams of the multimedia content.

The embodiments and systems defined herein are numerous, and the brief summary provided herein shall only serve as an overview of the many possibilities defined in the detailed description, drawings and the claims.

BRIEF DESCRIPTION OF THE DRAWINGS

FIG. 18 illustrates popularity vs. time graph and a promotional media vs. time graph that is used in determining the advertising revenue, in one embodiment of the invention.

DETAILED DESCRIPTION

Figure 1A:
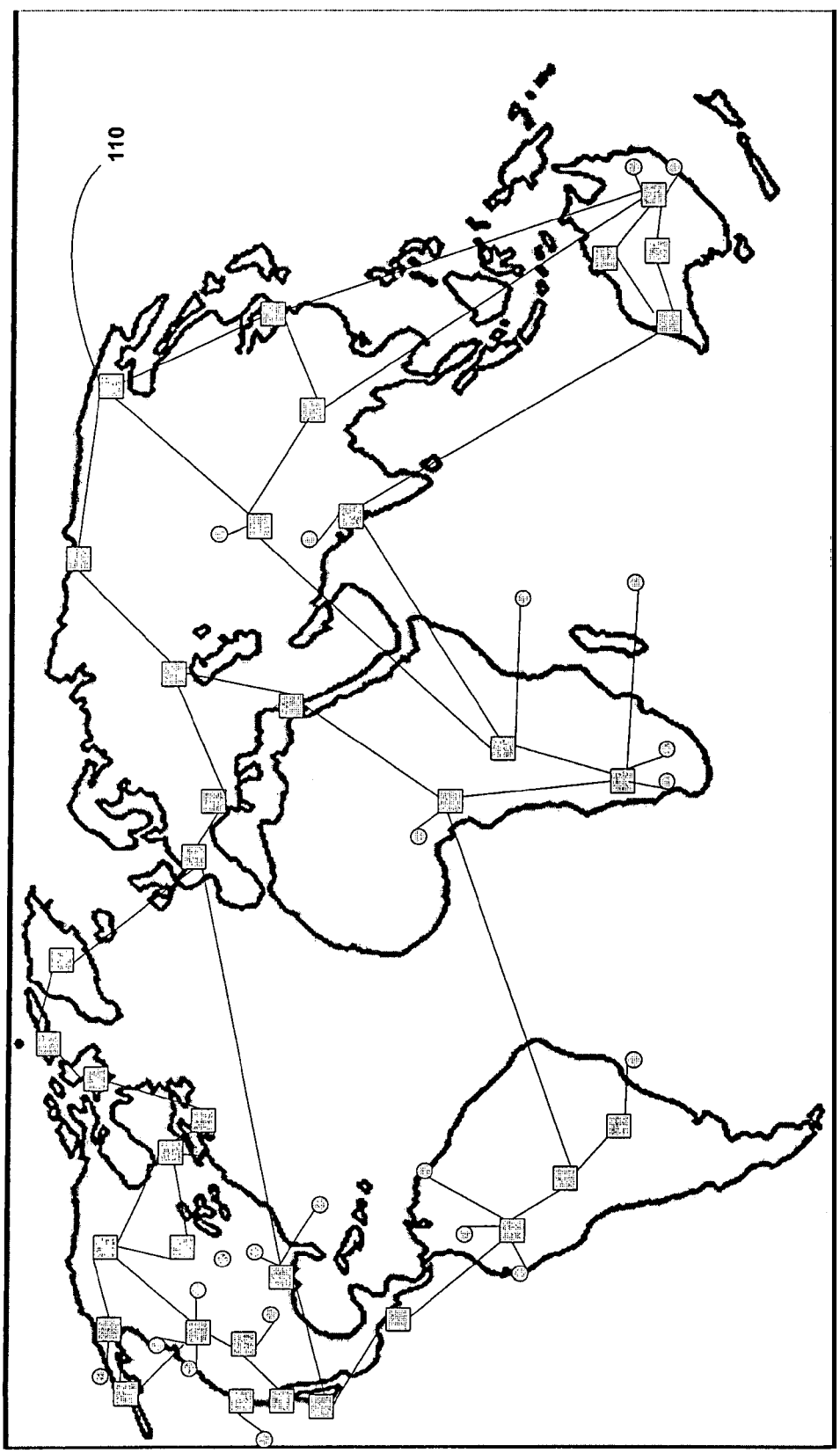
FIG. 1A is a schematic overview illustrating a network of server farms used, in one embodiment of the invention.

The present invention defines methods, systems, apparatus, networks and computer code that enables acquisition and management, indexing and distribution, and personalization and consumption of live multimedia content by creating a distributed real-time Network that can be searched, filtered and dynamically managed to change from one live multimedia feed to another depending on preferences, popularity, importance and interests of a consuming user, and feedback from the site of capture such as the location, time, and/or collocated people, objects, and/or events occurring and/or likely to occur at the site of capture, and/or the person and/or organization operating the capture device, or organized into channels or interactive environments by the Network operator for user consumption. The following description will include a section describing aspects of Discovery, followed by Switching processes and systems and a description regarding Monetization facilitated by embodiments defined herein.

The mechanisms of example embodiments include both a human element and computer element to provide for richly individualized and customized multimedia content to the consuming user. The human element includes multimedia generating users (GUs) and their electronic multimedia capturing devices (capturing devices), the multimedia consuming users (CUs) and their electronic multimedia receiving and feedback devices (alternately referred to as receiving devices). The computer elements include a communication network with a plurality of servers/server farms and a feedback engine through which the GUs and CUs interact with each other. The mechanism may include software and hardware that enables the acquisition and management of specific live multimedia content at specific times depending on the desires, likes, tastes and preferences of specific GUs and CUs of the multimedia content. Additionally, the multimedia content may be searched, filtered and dynamically managed to automatically switch from one live multimedia feed to another depending on preferences, popularity, importance and interests of CUs and GUs, and/or the location and/or time of capture, and/or collocated people, objects, and/or events at the site of capture, and/or the person and/or organization operating the capture device. The multimedia content can be searched, switched or filtered for specific events, topics, interests, locations, mapped locations, persons, groups, things, themes, genre, etc.

The GUs generate a plurality of multimedia content as multimedia streams covering specific live events or data using their respective multimedia capturing devices, and the CUs receive these plurality of multimedia content based on a plurality of criteria established by the CUs and Network and feedback engine operator(s). The CUs may provide continuous feedback to the feedback engine based on the CUs or the Network's established criteria so the multimedia content may be customized to suit the respective CUs' needs or the Network or Sponsor objectives. In one embodiment, the feedback engine receives continuous feedback from the CUs, iteratively customizes the content and publishes it to the CUs based on the received feedback. In another embodiment, the feedback engine may receive continuous feedback, feedback over varying intervals, or feedback in continuous cycles from the CUs which is then aggregated and forwarded to the GUs so that the GUs can make appropriate adjustments to capture the multimedia content requested by CUs or suggested by the Network. The cycle of providing the multimedia content, receiving feedback, and customizing the multimedia content based on the feedback continues as long as the CU is interested in the related event/data or the GU is capturing the streaming multimedia content. The feedback is also possible for asynchronous replay of organized content from past live events. The mechanism uses a dynamic and live two-way communication between the GUs and the CUs so that each of the CUs receives customized rich multimedia content that satisfies the respective CU's requirements.

The proposed scheme provides the advantage of empowering CUs to dynamically control the multimedia content for a specific event or data of interest and not having to rely on any specific content provider for the coverage thereby enriching the CUs' experience of viewing the multimedia content.

To facilitate an understanding of the various embodiments, the infrastructure of the feedback mechanism will be described first and a detailed description of the various processes of the disclosed embodiments will be described with reference to the feedback mechanism infrastructure. The feedback mechanism is implemented on a server of a computing system and is made available to all users through a communication network, such as an internet. A basic computer network on which the feedback mechanism is implemented will be described first and the features of the disclosed embodiments will be described with reference to the described basic computer network.

FIG. 1A illustrates a basic computer network in which an interactive multimedia feedback mechanism may be implemented in order to provide customized content rich multimedia stream to a consuming user, in one embodiment of the invention. The computer network includes a combination of a plurality of server computing systems (servers) and a plurality of server farms 110 that are distributed across the globe and are communicatively connected to each other through a communication network (network), such as an internet. Each of the server farms 110 may, in turn, include a plurality of servers interconnected using the internet and intranet (communication network within a certain entity). The servers are capable of implementing the interactive multimedia feedback mechanism (feedback mechanism). The feedback mechanism may be implemented on one server within a server farm and accessed through the network by other servers or may be implemented on more than one server and accessed by other servers. A plurality of Generating Users (GUs) 200 having one or more electronic multimedia capturing devices and a plurality of Consuming Users (CUs) 300 having one or more electronic multimedia receiving and feedback devices (receiving devices) are communicatively connected to the computer network through a plurality of servers or server farms 110. The multimedia capturing devices of GUs 200 enable the GUs 200 to capture and transmit multimedia content in real-time to the feedback mechanism on the server where the multimedia content is processed and published to the CUs 300. The multimedia content published by the feedback mechanism maybe in the form of a single feed, composite feeds and/or feeds that are mixed or re-mixed. The computer network, thus, enables a GU 200 to capture and transmit multimedia content from anywhere in the world to the CUs 300 through the feedback mechanism and the CUs 300 have the ability to hone in on any specific event or data or combination of different events and data in the world through the feedback mechanism.

In an alternate embodiment of the invention, a plurality of Generating Users (GUs) 200 having one or more electronic multimedia capturing devices and a plurality of Consuming Users (CUs) 300 having one or more electronic multimedia receiving and feedback devices (receiving devices) are communicatively connected to one another through a computer network. The multimedia capturing devices of GUs 200 enable the GUs 200 to capture and transmit multimedia content in real-time to the feedback mechanism on the receiving devices of one or more CUs where the multimedia content is processed and published at the CUs 300. The multimedia content processed and published by the feedback mechanism maybe in the form of a single feed, composite feeds and/or feeds that are mixed or re-mixed. In this embodiment, the CUs and GUs interact in a peer-to-peer fashion. The computer network, thus, enables a GU 200 to capture and transmit multimedia content from anywhere in the world to the CUs 300 through the feedback mechanism and the CUs 300 have the ability to hone in on any specific event or data or combination of different events and data in the world through the feedback mechanism.

Figure 1B:
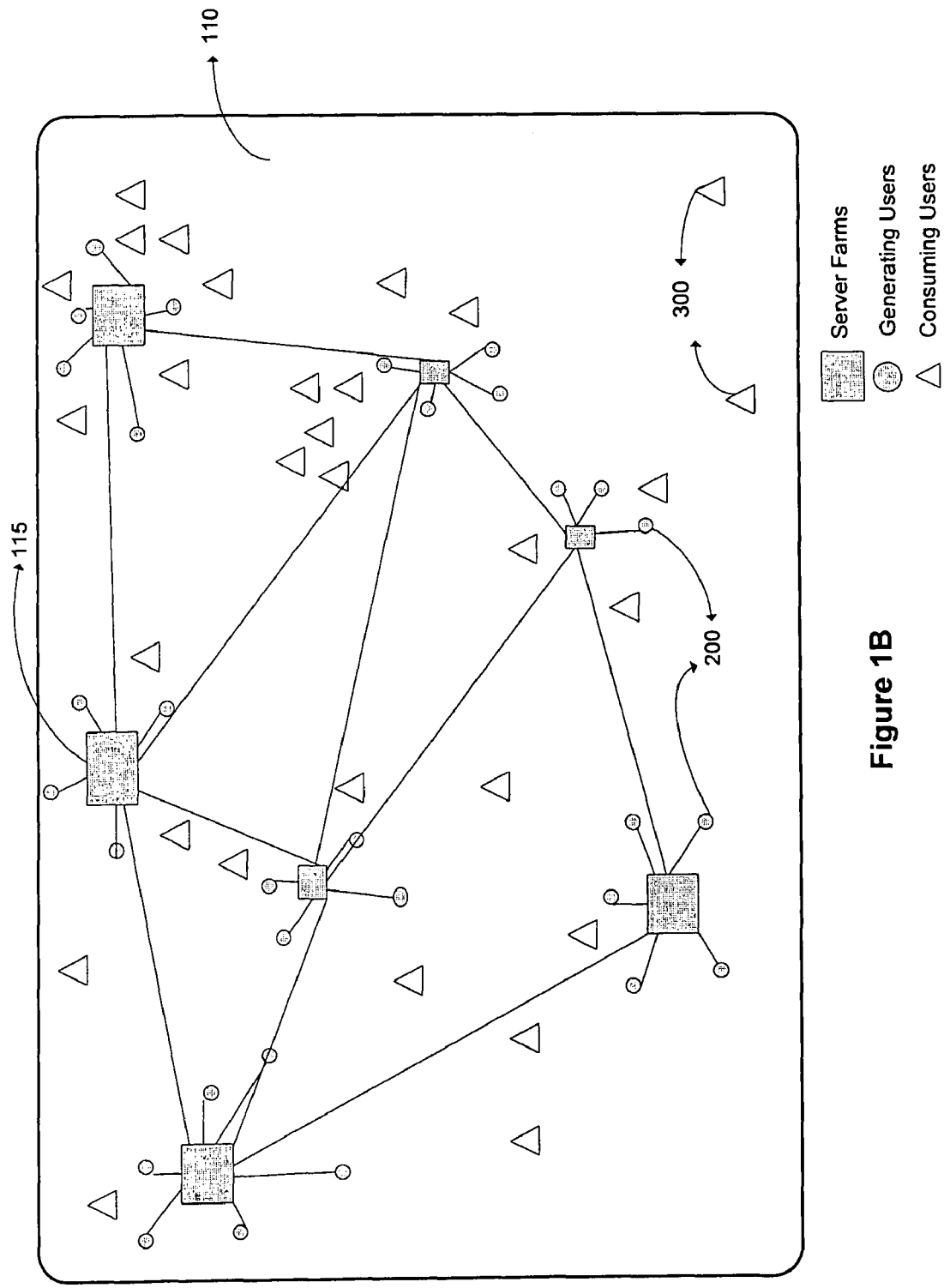
FIG. 1B represents an overview of a server farm, in one embodiment of the invention.

FIG. 1B illustrates an exemplary overview of a server farm used for capturing multimedia content and transmitting the multimedia content over the network, in one embodiment of the invention. Of course, the system does not require a complete farm of servers, as it is possible to set up a single network computing device, so long as the processing power is sufficient to enable the functionality. However, as more users and distribution throughout the globe is implemented, more computing devices will be required, to enable a more robust infrastructure.

As shown, the server farm 110 includes a plurality of server computing systems (servers) 115 that are communicatively connected to other servers 115 within and outside the server farms 110 using communication network (network), such as the internet. A plurality of electronic multimedia capturing devices belonging to one or more GUs 200 may be communicatively connected to the servers, to capture and transmit multimedia content real-time to other servers in the network.

Figure 2A:
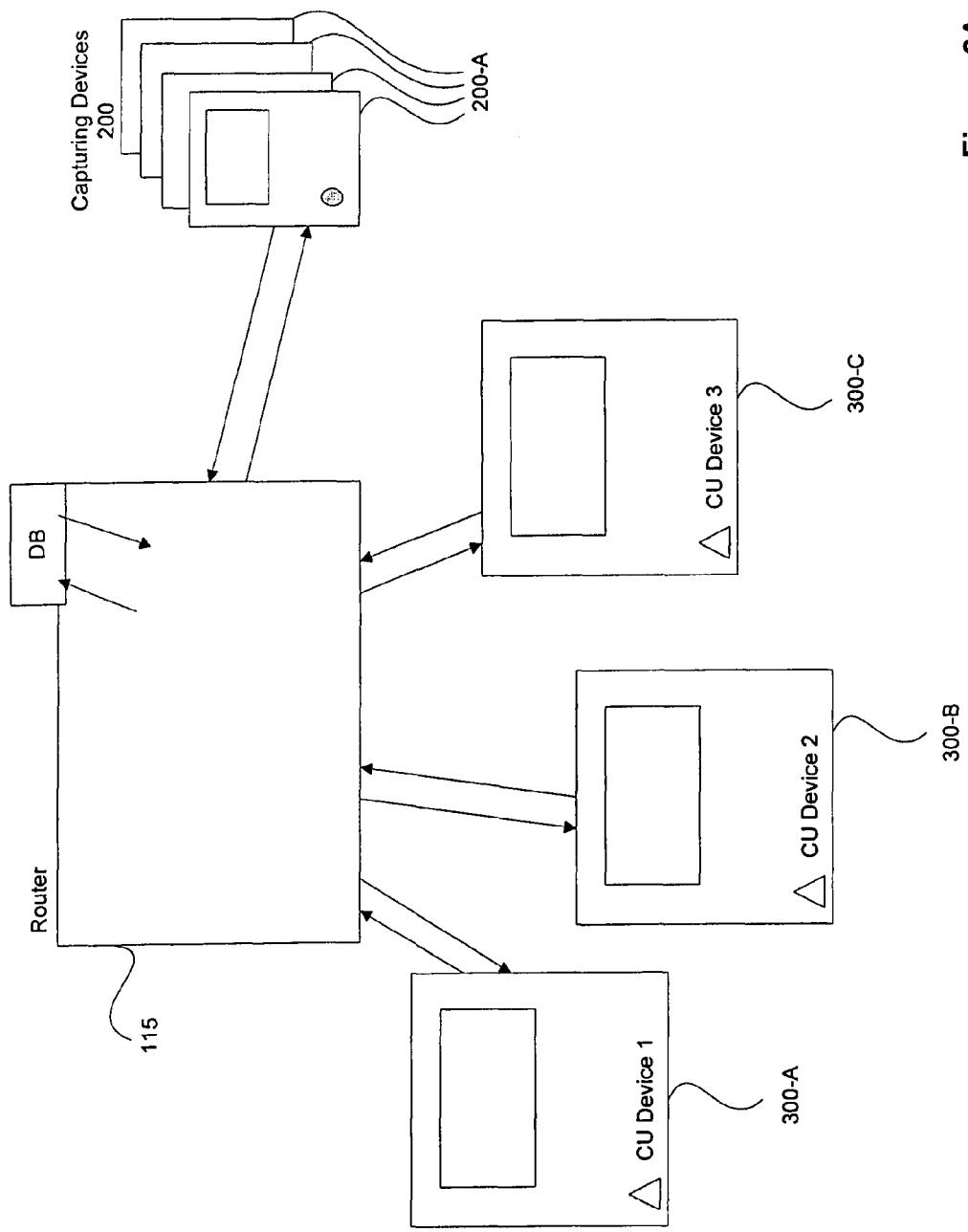
FIG. 2A illustrates an overview of a live multimedia feedback network used in the capture and distribution of multimedia content, in one embodiment of the invention.

FIG. 2A illustrates an overview of a simplified multimedia transmission mechanism implemented on a server, in one embodiment of the invention. As shown, a plurality of capturing devices 200-A of a plurality of GUs is used in capturing and transmitting multimedia content to a server 115 on the network. The server 115 includes a feedback mechanism that processes the multimedia content and acts as a router and routes the appropriate multimedia content to one or more consuming users (CUs) 300 receiving devices 300-A, 300-B or 300-C. The multimedia content transmitted by the GUs 200 is also stored in a repository, such as a database, that is communicatively connected to the server 115 so that the multimedia content can be retrieved upon request from one or more CUs. In one embodiment, the database is part of the server 115. In another embodiment, the database is on a different server, such as a database server, and communicatively connected to the server 115. The multimedia content received from the feedback mechanism on the server 115 is rendered on one or more multimedia receiving and feedback devices of the CUs 300 communicatively connected to the server 115. The multimedia receiving devices of the CUs 300 can be of any form so long as they are configured to receive and render the multimedia content and transmit feedbacks to the feedback mechanism on the server 115. The feedback received from each of the CUs 300 receiving devices is used by the feedback mechanism to customize the multimedia content for the respective CUs 300.

Figure 2B:
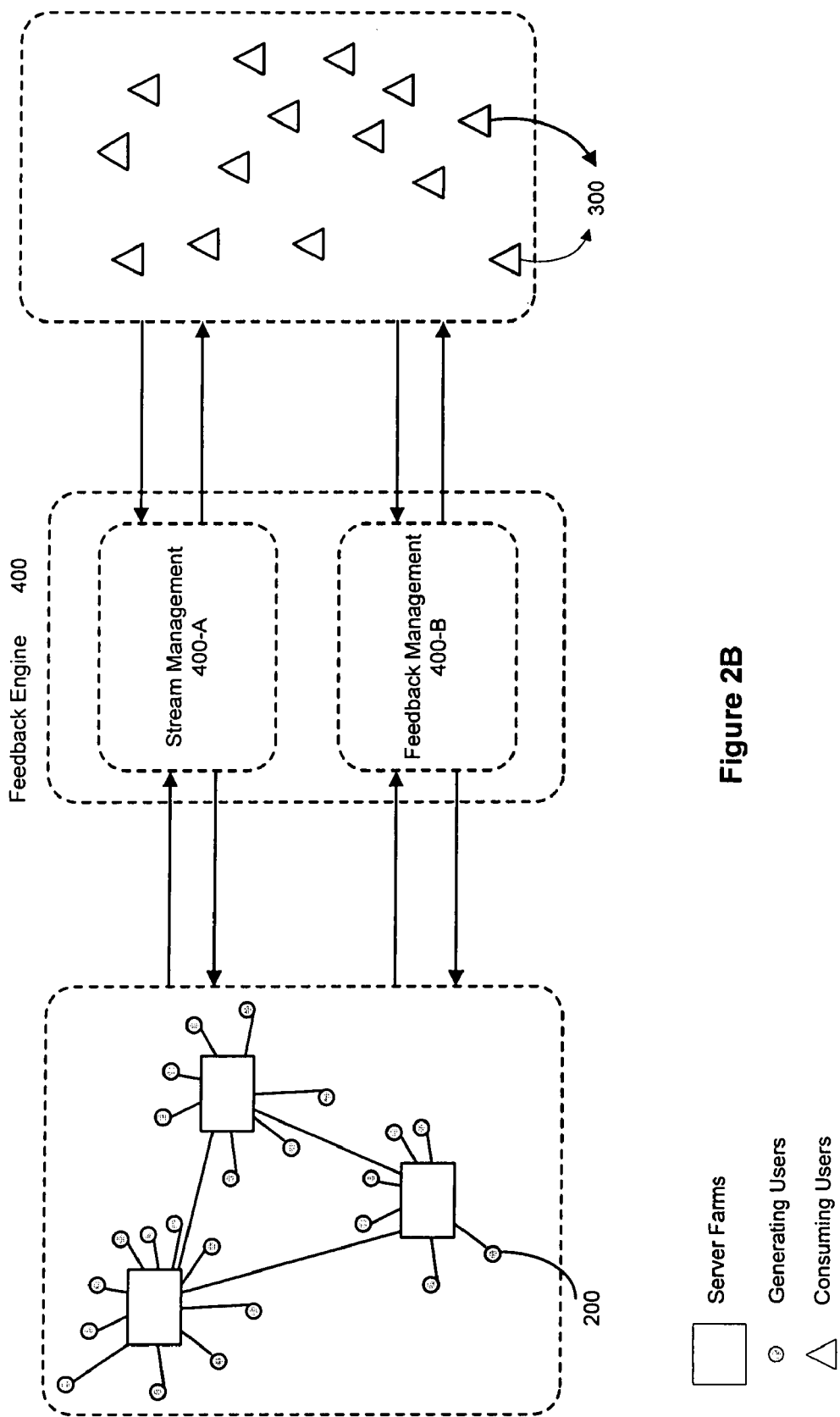
FIG. 2B illustrates an overview of the system using a feedback engine, in one embodiment of the invention.

FIG. 2B illustrates a block diagram of a feedback mechanism used in providing real-time customized multimedia content to a consumer, based on requests and feedbacks from a Consuming User (CU) 300, in one embodiment of the invention. The feedback mechanism includes a feedback engine 400 with a stream management module 400-A and a feedback management module 400-B. An overview of the function of the feedback engine is explained with reference to FIG. 2B with a more detailed explanation provided with reference to FIG. 2C below. In one embodiment of the invention, the stream management module 400-A receives an initial request from the consuming users (CUs) 300 for specific real-time multimedia content and searches the network to identify a plurality of generating users (GUs) 200 that are capable of providing the requested multimedia content. This embodiment has been described with a CU initiating a request for multimedia content. However, other Users on the network may initiate such request or the GU 200 may forward the multimedia content to other Users on the network.

The stream management module 400-A validates the identified GUs 200, the multimedia content and/or multimedia content topics captured by the GUs 200, gathers the multimedia content from the identified GUs 200, indexes, formats the multimedia content based on the CUs viewing criteria, such as preference, location, hardware, network-affiliation, demographic, subscriber status, etc., and distributes the formatted multimedia content to the requested CUs 300 as multimedia streams. Upon receipt of the multimedia streams, the CUs 300 may provide feedback on the multimedia content to the GUs 200 through the feedback management module 400-B.

The feedback management module 400-B instruments the display format for rendering of the multimedia streams at the receiving devices, controls various forms of interaction of the CUs 300 related to the multimedia content streams, gathers the interactions in the form of a feedback, reviews, indexes, prioritizes and publishes the feedback real-time to the GUs 200. The feedback from the CUs 300 can be directed to a specific GU 200 or to other CUs 300 within a CUs network or to all CUs 300 and GUs 200 in the network. In case of a feedback loop, the CUs 300 provide feedback data related to the multimedia content streams, the GUs 200 respond by providing multimedia streams based on the CUs 300 feedback, the CUs 300 respond with further feedback, and so on. The feedback loop process continues as long as the CUs 300 are interested in the multimedia content or the GUs 200 continue capturing and transmitting the multimedia streams related to the event/data. In one embodiment, CUs 300 can refer to an older multimedia content and provide post-real-time feedback for GUs 200 to improve their future content productions or to request another revision of the existing/saved multimedia content. Details of the feedback loop process are explained in more detail with reference to FIG. 5.

The functional aspects of the feedback mechanism can be broadly classified into three main processes—Discovery, Switching and Monetization. The Discovery process uses an interactive live multimedia feedback mechanism and network to provide the infrastructure for a plurality of Generating Users (GUs) 200 to capture and transmit the multimedia content over the network real-time so as to allow a plurality of Consuming Users (CUs) 300 to receive the multimedia content and provide real-time feedback so that the multimedia content may be switched, mixed and re-mixed to obtain optimal multimedia content streams that meet a CU's requirement. The Switching process uses a live multimedia switching network to provide the infrastructure for a plurality of CUs 300 and GUs 200 to perform the switching of multimedia content based on live feedback from the CUs 300. The Monetization process includes metrics that define the monetization scheme used during the capturing of multimedia content by the GUs 200 and publication of multimedia content at the CUs 300. The various processes are explained in greater detail hereunder.

I. Discovery Process:

A Discovery process is where a plurality of Generating Users (GUs) 200, consuming users (CUs) 300 and multimedia content for broadcasting and viewing are identified so that a customizable multimedia content may be provided to the CUs. The term "Discovery," as used in the context of this application, should be broadly construed to encompass any functionality and process that would enable searching for particular content, filtering the content, identification of sources (GUs) throughout the global network, and identification of certain categories of sources from the global network. The identification can be done in any number of ways associated with searching, indexing, filtering, hierarchy definitions, weighting algorithms or any other optimization programs that may be linked, coupled to or run in conjunction with a process being performed to do the Discovery function or functions. The processing can be performed using distributed processing, to optimize the substantial real-time presentation, feedback and interactivity.

In one embodiment, the Discovery process is initiated by a plurality of GUs 200, a plurality of CUs 300 or by a plurality of Mixers. The Discovery process encompasses multiple phases or levels of discovery including discovery of an event/topic, discovery of one or more GUs 200 on the computer network covering the event/topic, discovery of CUs 300 and Mixers interested in the event/topic, generating feedback from GUs 200, CUs 300 and Mixers and transmitting the feedback to the respective recipients in order to provide a rich context based custom multimedia stream to the CUs 300. In order for the GUs 200, CUs 300 and Mixers to initiate the discovery process each of the GUs 200, CUs 300 and Mixers should be registered on a computer network having a feedback mechanism, as described in FIGS. 1A and 1B, so that the GUs 200, CUs 300 and Mixers can be validated and identified for broadcasting or receiving the multimedia content for a specific event/topic.

A GU 200 can initiate a discovery process on the registered computer network by generating an alert to the computer network (network). An alert may be in the form of a signal that suggests the GU 200 is registered on the network. Additionally, the alert may further indicate that: i) the GU is preparing to broadcast multimedia content; ii) the GU has begun to capture and broadcast multimedia content for a specific event (going live and recording); iii) GU is available to capture and broadcast multimedia content independently or with other GUs as part of a team; iv) the multimedia content captured by the GU is available to be "mixed"; v) the GU has uploaded or made available multimedia content in the computer network (network) or vi) the GU is available to invite Mixers, CUs and other viewers, such as advertisers, to view the multimedia content that the GU is capturing and broadcasting. The GU may initiate a discovery process based on an economic or social incentive.

Figure 11:
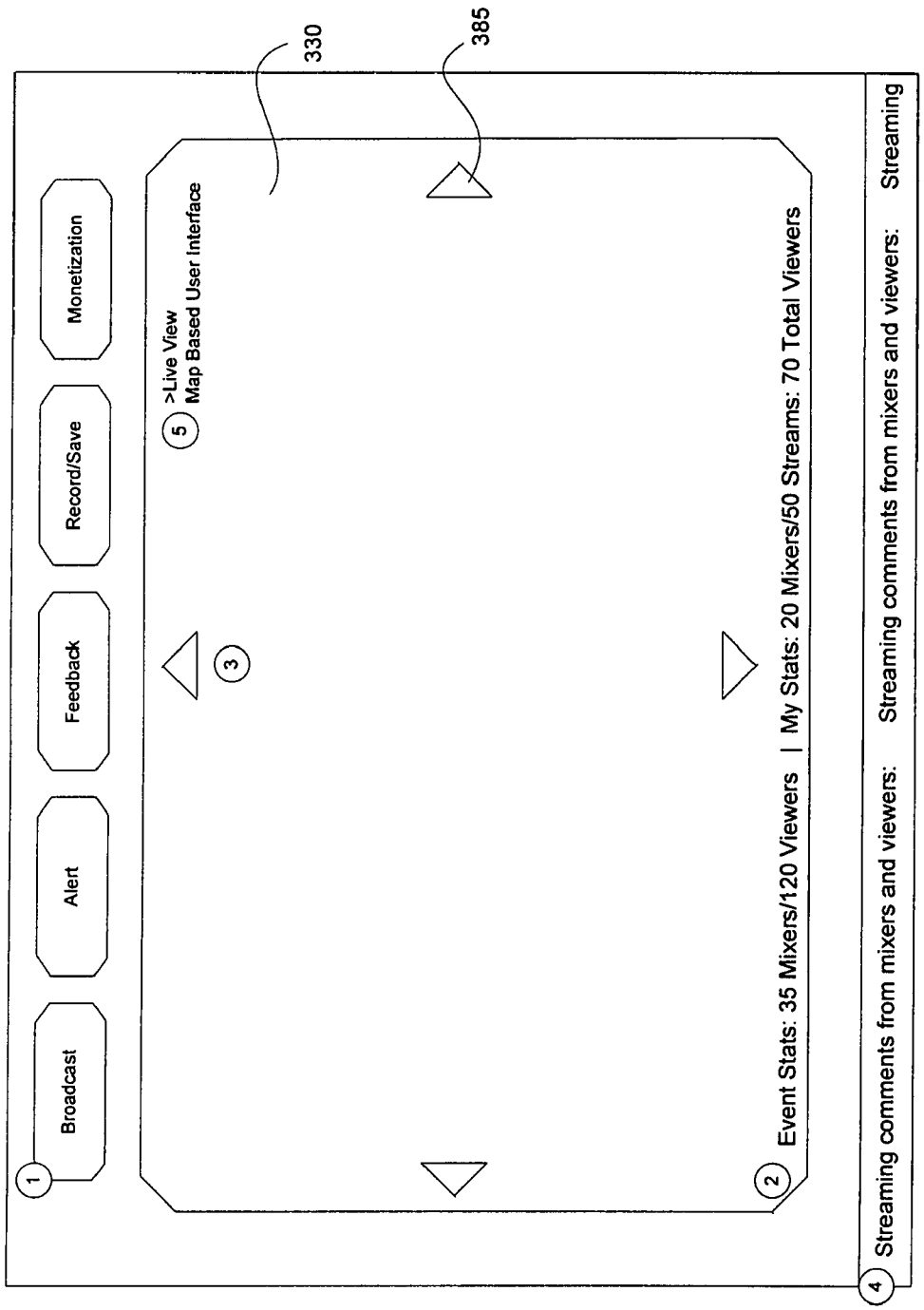
FIG. 11 illustrates a GU's capturing device, in one embodiment of the invention.

The multimedia capturing devices associated with the GUs and used for capturing and broadcasting multimedia content may include various controls that enable the GUs to capture and provide real-time feedback for the multimedia content. A representation of a capturing device used in capturing and broadcasting multimedia content by a GU is illustrated in FIG. 11, in one embodiment of the invention. In this embodiment, the capturing device may include a view window 330 to display the captured event/data, a plurality of hardware controls on the device as represented by "bubble 1" that define the status of the multimedia content generated by the GU 200 and the availability of the GU 200 to broadcast multimedia content or to mix multimedia content with other media content provided by other GUs 200, CUs 300 or other users interested in the multimedia content that are on the network. For instance, the "Broadcast" control may be used to initiate transmission of captured multimedia content from the GU's 200 capturing device to the network so other users may be able to view the broadcasted multimedia content and may also indicate to the GUs 200 the status of the captured multimedia content (whether the multimedia content is being broadcast or not). The "Alert" control may be used to alert a plurality of CUs 300, other GUs 200 and other interested user groups, such as advertisers or mixers, about the GU's 200 availability to broadcast as an independent broadcaster or as a group, or the availability of multimedia content for mixing and/or to invite mixers, other GUs 200, CUs 300 and other interested user groups, such as advertisers, to view the broadcasted multimedia content. The "Feedback" control may be used to receive and render real-time feedback from CUs, other GUs and interested user groups on the broadcasted multimedia content. The real-time feedback may be provided as text, speech, non-speech audio, graphics, animation, photos, video, vibration signals, temperature variations, or combinations of these modalities, as well as other multimedia or multimodal means of communication. The feedback may be specific to the content of the broadcasted multimedia or may be to coordinate the broadcast. The "Record/save" control may be used to provide an option to store the multimedia stream locally on the capturing device or on a remote storage device accessible to other users on the network through a central server. The "Monetization" control may be used to provide a way to monazite the multimedia content through sponsorship, product placement, advertising media, or surface monetization. In another embodiment, the plurality of controls in the capturing device is provided through software. The software is received from the network and rendered on the capturing device. The rendered software includes Graphical User Interface (GUI) and special functionality to enable the plurality of controls so that the capturing device may perform like a capturing device with specialized hardware controls.

In one embodiment, the real-time feedback from the CUs, GUs and other users may be defined by metadata, which may provide useful information about the popularity of the multimedia content and/or any other relevant information. For instance, the popularity may be defined by statistics, such as the number of viewers who are currently tuned to the broadcast, as indicated by "bubble 2", or maybe in the form of directional arrows that indicate the point of interest which the CU would like the specific GU's capturing device to point, as shown in "bubble 3", or as streaming comments received from CUs and other users, as shown in "bubble 4" or as a map based user interface, as shown in "bubble 5".

Figure 14:
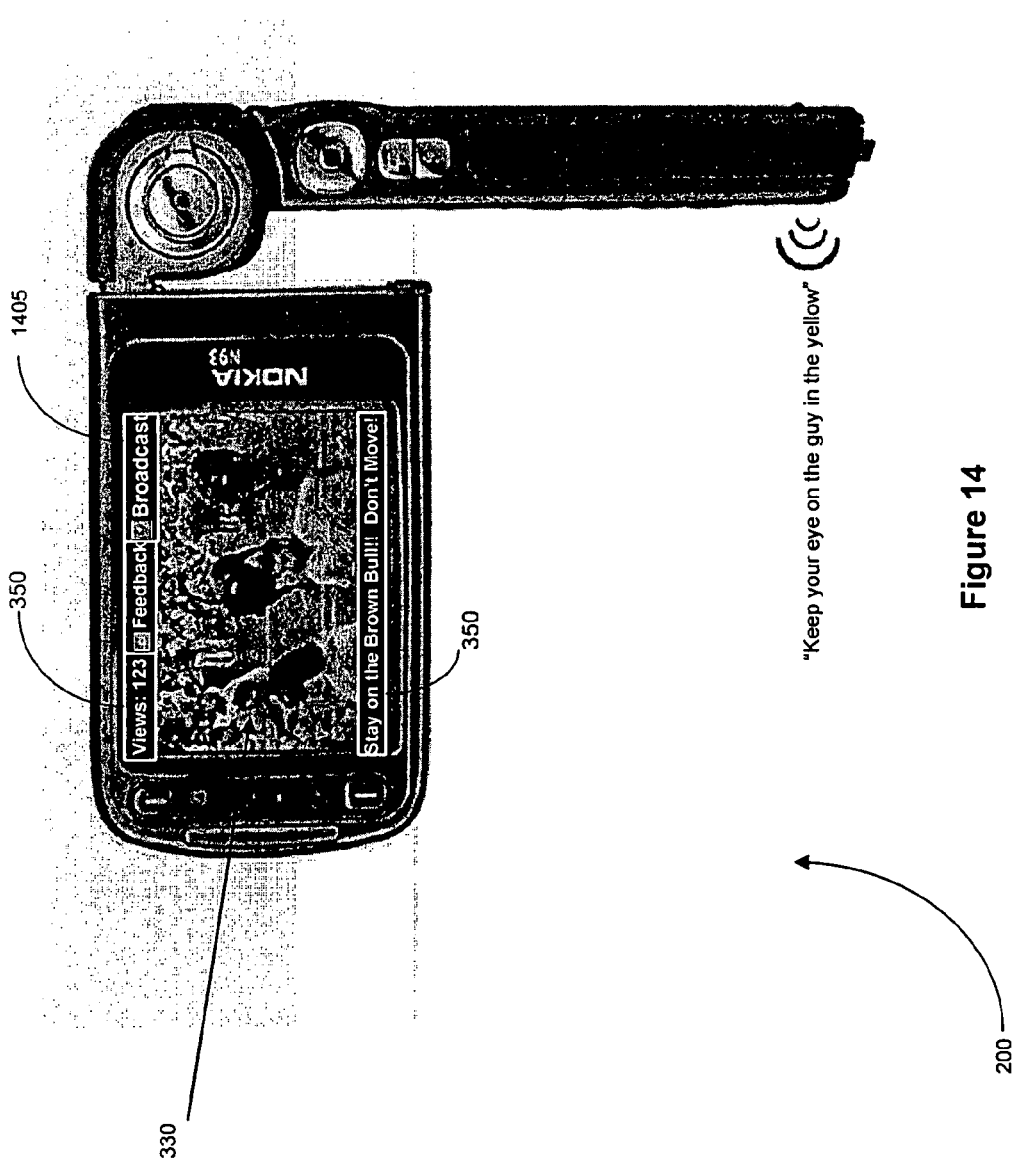
FIGS. 14, 14A and 14B illustrate a GU's mobile device used in capturing multimedia streams for an event with real-time status of the broadcasted multimedia streams, in one embodiment of the invention.
Figure 14A:
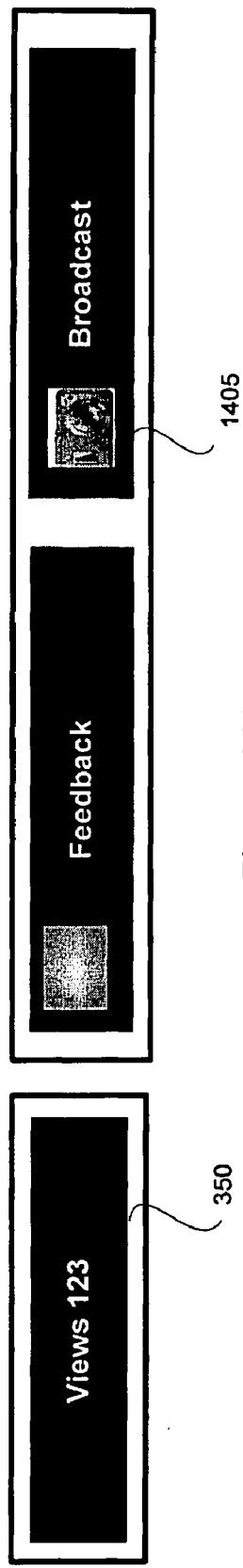
Figure 14B:

A snapshot of an actual mobile capturing device used by a GU 200 to capture and broadcast multimedia streams for an event is illustrated in FIG. 14, in one embodiment of the invention. As shown, the mobile capturing device includes a plurality of controls, similar to the ones discussed in detail with reference to FIG. 11, that are used to provide real-time status of the multimedia stream currently being captured and transmitted. For instance, the real-time status may include statistics on the users, such as CUs, GUs, and Mixers, as illustrated in box 350 of FIGS. 14 and 14A, and/or the real-time streaming feedback from CUs requesting continued coverage of the event/topic (including the location, time and/or collocated people, objects, and/or events occurring and/or likely to occur at the site of capture, and/or the person and/or organization operating the capture device), as illustrated in box 350 of FIGS. 14 and 14B. Additionally, the mobile capturing device includes control buttons, as illustrated in FIG. 11 and in box 1405 of FIGS. 14 and 14A. The feedback may be specific to the location or specific to the event or specific to the GU.

In one embodiment, a CU 300 can initiate a discovery process by registering and requesting multimedia content for a specific event/topic to a computer network (network) on which a feedback engine is available. The CUs 300 can initiate a search for the multimedia content based on tagging provided for an event/topic captured by the GUs 200. In one embodiment, the tagging could be provided by the GUs 200 and made available to other Users on the network. In another embodiment, the tagging could be provided by both GUs and CUs to enable easier and faster searching of multimedia content related to the particular event/topic. The multimedia content can be any one or more of text, audio, video, graphics, vibrations, etc. that can be captured and published on the network. The GUs, CUs and Mixers then proceed to use a live multimedia feedback mechanism and network to broadcast and receive the multimedia content.

The CUs multimedia receiving and feedback device (receiving device) used in requesting multimedia content may include various controls to enable CUs to request, receive and render the multimedia content on the receiving device real-time and to provide real-time feedback on the received content. As mentioned with the capturing devices, the various controls in the receiving device may be provided in the form of hardware controls or software controls. In the embodiment where the controls are provided through software, the software is received from the network and rendered on the receiving device. The rendered software includes Graphical User Interface (GUI) and special functionality to enable the plurality of controls so that the receiving device may perform like a device with specialized hardware controls.

Figure 12:
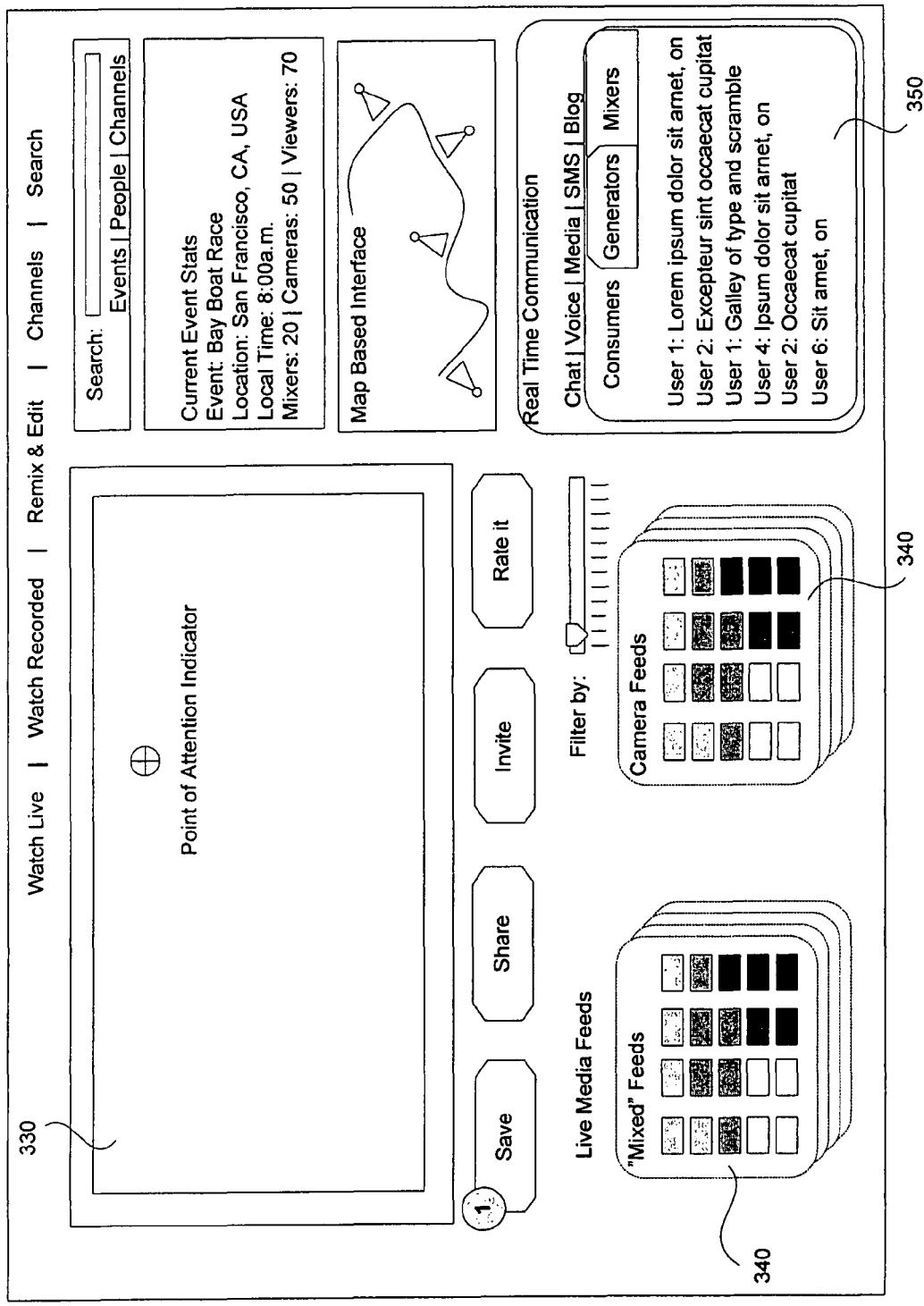
FIG. 12 illustrates a CU's receiving and feedback device, in one embodiment of the invention.

Additionally, the receiving device may be configured to edit and remix the content of the received multimedia streams with content generated by CUs or from other multimedia files provided by other registered users on the network. A representation of a receiving device used in receiving and providing feedback in substantial real-time is illustrated in FIG. 12, in one embodiment of the invention. As shown, the receiving device includes a set of option controls illustrated by "bubble 1" that allow the CUs to save partial or complete multimedia content broadcasted by the GUs for a specific event/topic, to invite and/or share the multimedia content with other CUs, Mixers and other interested users and to provide feedback on the multimedia content to GUs, CUs, Mixers and other users on the network. In one embodiment, the feedback may include comment about the Mixers, GUs, content of the multimedia, location, time, and/or collocated people, objects, and/or events occurring and/or likely to occur at the site of capture, and/or the person and/or organization operating the capture device, subject, etc., through online chat, voice, media, Short Message Service (SMS) (commonly used by mobile receiving devices), online web log (Blog), etc.

In addition to the option controls, the receiving device may include a view window with a "Point-of-Attention Indicator" for providing feedback to the GUs; a filtering mechanism to receive and filter multiple multimedia feeds related to the event/topic based on individual's preference criteria; a mixer mechanism to receive, save and use multiple "Mixed" feeds with the multimedia content and forward the Mixed feeds to the network for other users to view; a real-time communication window to provide real-time feedback; and multimedia content information mechanism to provide information in the form of metadata (including statistics) on the specific event/topic. In one embodiment, the point-of-attention indicator may be used to provide directional information for the GU so that the GU can adjust the capturing device to capture a specific area of interest in the broadcasted multimedia content or outside the broadcasted multimedia content. Additionally, the indicator may provide feedback regarding zooming in or out. The feedback from the indicator is transmitted to the GU through the FE and appears in the GUs viewfinder as directional arrows or other forms of feedback, such as sound, a heat map, icons, vibration, etc. In one embodiment, the receiving device may further include a map based interface to provide the user with the ability to request multimedia content from other locations of the event/topic through geo-locator related metadata that may indicate the location of the GUs in the map of an event/topic and also the direction in which a recording device is pointing. The map is fully interactive. In one embodiment, a search interface may also be provided to search other events, people or channels that may be of interest to the CU.

Figure 15:
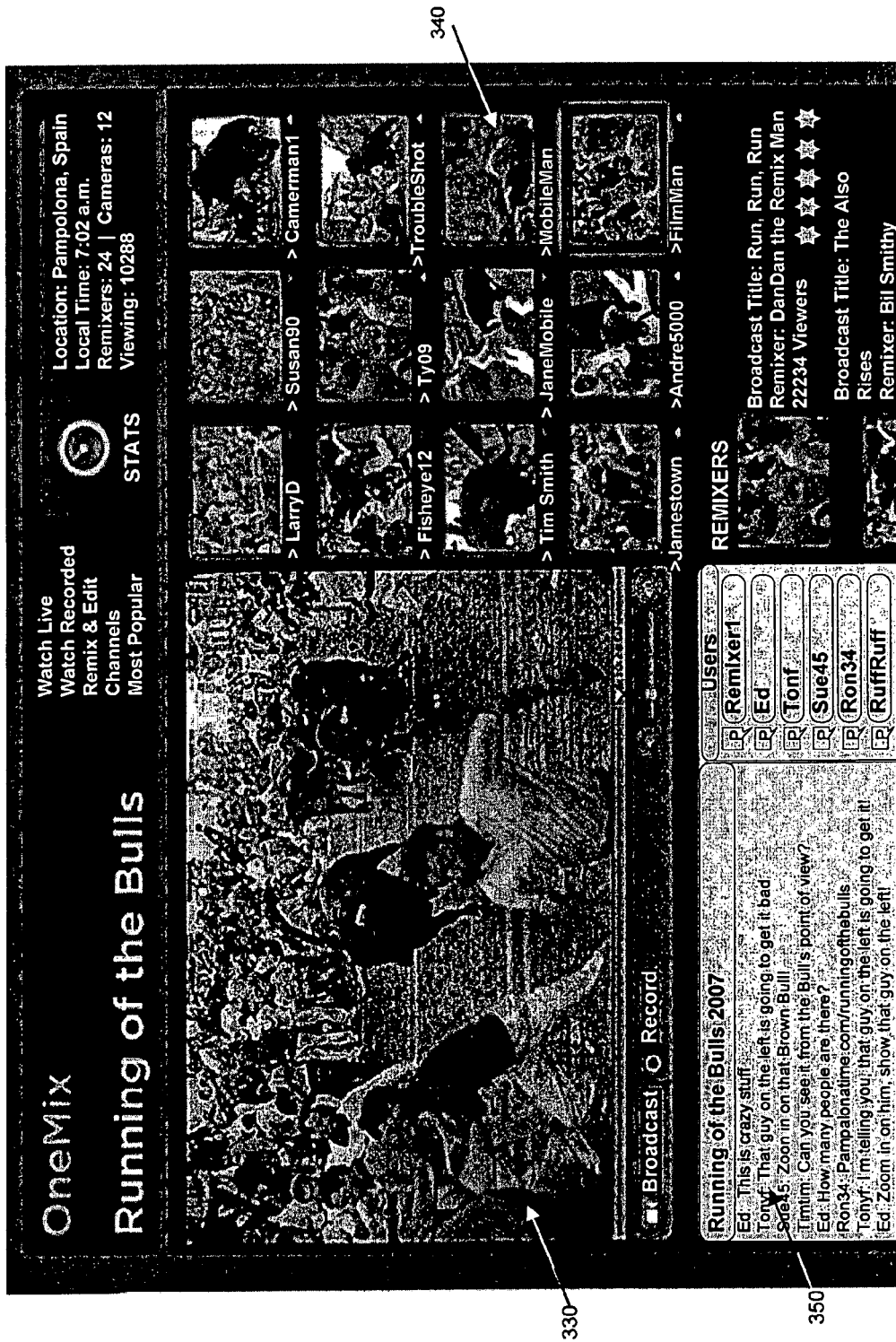
FIG. 15 illustrates a CU's receiving device used in receiving and rendering multimedia streams for an event, in one embodiment of the invention.

FIG. 15 illustrates a snapshot of an actual CU's multimedia receiving and feedback device (receiving device), in one embodiment of the invention. As shown, the receiving device includes a viewing (point-of-interest) window which displays the multimedia stream captured by a specific GU that is currently selected for viewing by the CU, a plurality of smaller windows that indicate the multimedia streams received from other GUs or same GU covering the same event/topic. The multimedia streams in the smaller windows could be from a single location or from a plurality of locations within the same event/topic. In one embodiment, the plurality of smaller windows includes information about the GUs, such as identification, location, etc., so that the CU can identify the GUs that are currently capturing the multimedia streams. This information may be used in the socialization aspect, where CUs and GUs having same or similar interests may interact with each other, and/or by a sponsor/mixer/advertiser/other user to place an advertisement for revenue generation, or other forms of value creation and tracking, or to just provide a comment. It is to be noted that the revenue generation and other forms of value creation and tracking is not restricted to the financial aspect but also includes social aspect.

Figure 16:
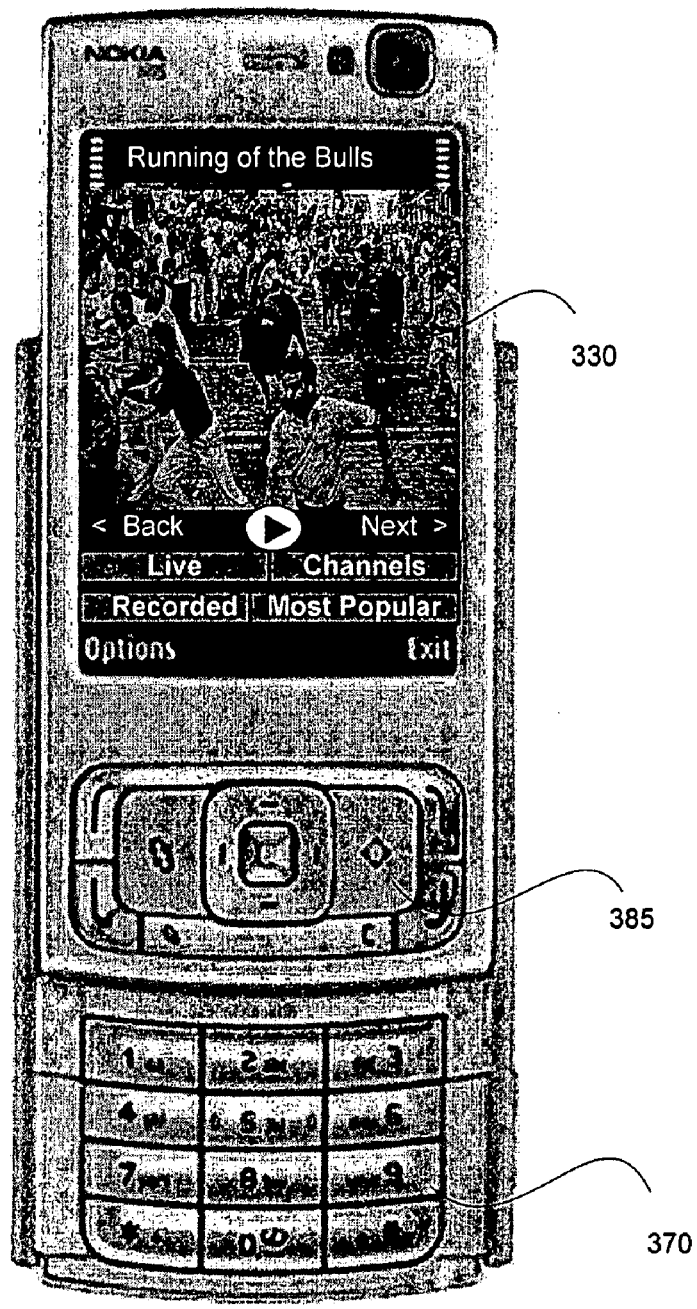
FIG. 16 illustrates a CU's mobile receiving device used in receiving, rendering and providing feedback to multimedia streams, in one embodiment of the invention.

FIG. 16 illustrates a snapshot of an alternate embodiment of a CUs receiving and feedback device. As shown, a mobile multimedia receiving and feedback device is used in requesting, receiving and providing feedback to the multimedia content. As in the other embodiment, the mobile receiving device includes a point-of-interest window 330 to display the multimedia stream captured by a specific GU that is currently selected for viewing by the CU, with additional controls in the form of a navigation control 385 to navigate through various options available at the mobile phone device and a keypad 370 for providing substantial real-time feedback related to the rendered multimedia content, to enable the CU to switch to other multimedia streams from the same GU or by other GUs or provide feedback to the rendered multimedia stream. The multimedia stream rendered on the mobile multimedia receiving device of the CU may be automatically selected using selection criteria available at the FE 400, by the CU or by the network. In one embodiment, the selection criteria may use popularity of the multimedia stream, popularity of the GU, popularity of the event/topic, location, time, and/or collocated people, objects, and/or events occurring and/or likely to occur at the site of capture, status of a GU, status of a CU, etc. for the selection of the multimedia stream to be rendered on the CU's receiving device.

In one embodiment of the invention, a Mixer may initiate a discovery process on the computer network by registering and then viewing or requesting multimedia content for a specific event/topic or multiple events/topics or some combination thereof. As used in this application, a "Mixer" is a user who is not a CU or a GU but has an interest in the multimedia content broadcast by the GUs and is desirous of mixing other multimedia content into the multimedia content streams currently being broadcast and/or switching between one multimedia content stream and another to perform real-time (or post-real-time) editing of the multimedia content streams. The other multimedia content may or may not be related to the content within the multimedia content streams and may either originate from the mixer or maybe available on the computer network. As with the GUs, the Mixer can initiate a discovery process based on an economic or a social incentive.

To assist the Mixer in receiving multimedia content, the Mixers are equipped with a multimedia receiving and feedback device (mixer-receiving device) to enable the mixer to receive and view the multimedia content real-time and to provide real-time feedback on the received content. In one embodiment, a mixer-receiving device (receiving device) is similar to a CU's receiving device. As mentioned with the CUs receiving devices, the various controls in the Mixer's receiving device may be provided in the form of hardware controls or software controls. In the embodiment where the controls are provided through software, the software provided controls are similar in nature to the ones discussed with respect to the CUs receiving devices and are obtained and implemented in a similar manner.

Figure 13:
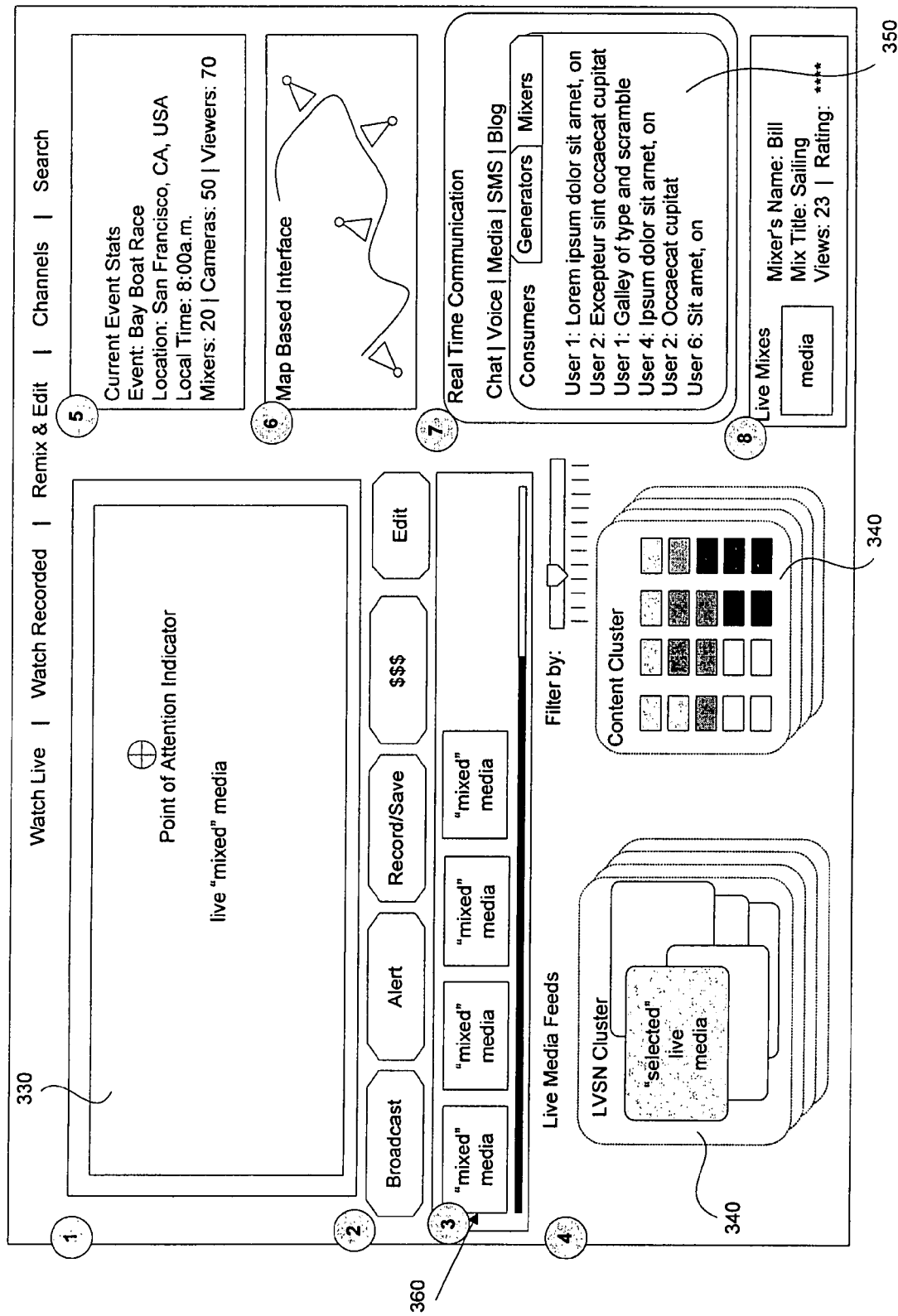
FIG. 13 illustrates a Mixer's receiving and feedback device, in one embodiment of the invention.

In addition to the mechanisms that are available on the mixer-receiving device that are similar to the CUs receiving device, the mixer-receiving device is equipped with a graphical representation of previously selected mixed/switched media streams (bubble 3), and a live mixes option (bubble 8) to view other live mixes of the same event instead of the CU receiving device's search option. A sample representation of a mixer-receiving device used by a Mixer is illustrated in FIG. 13, in one embodiment.

Figure 2C:
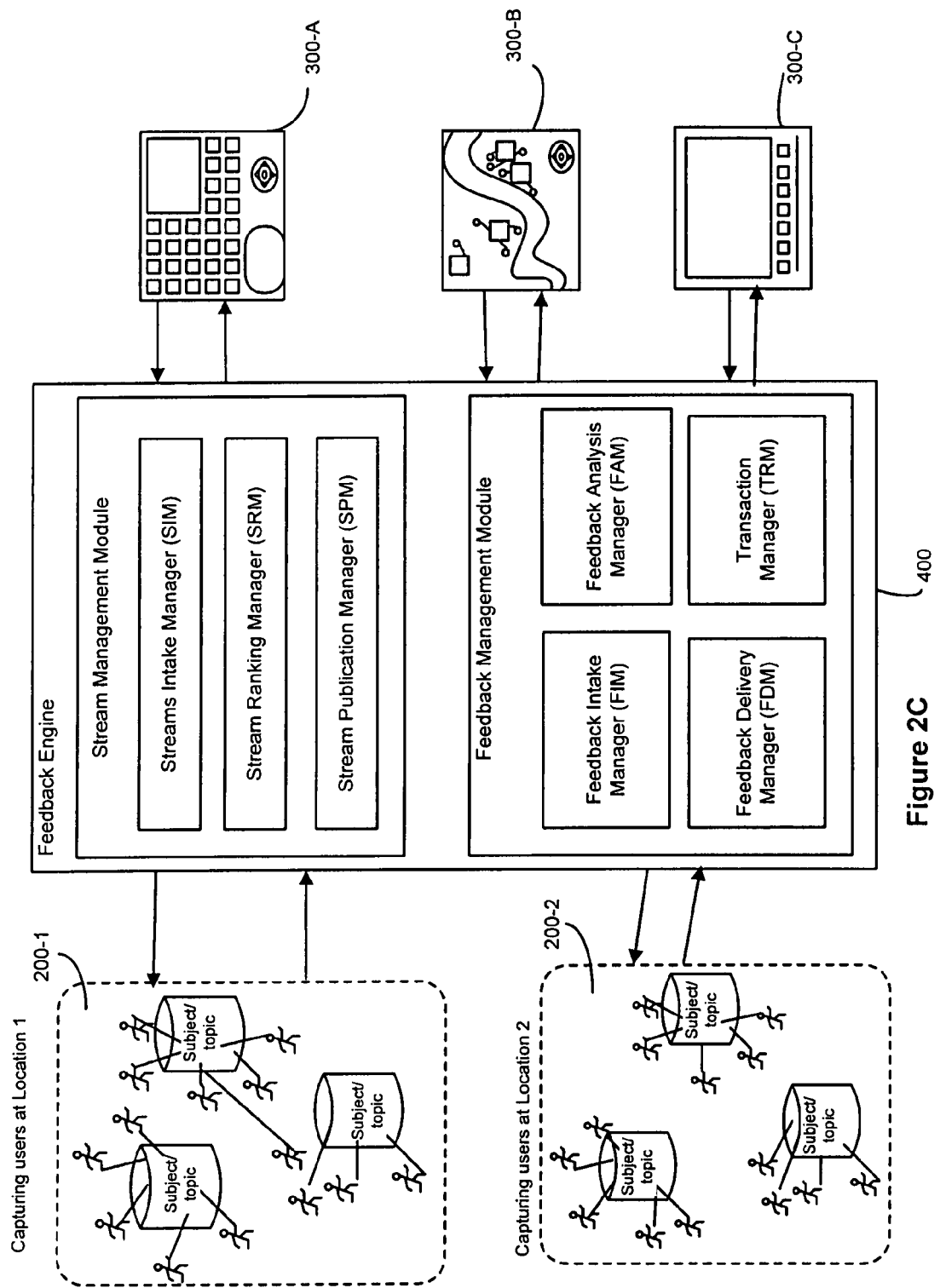
FIG. 2C illustrates a detailed view of a live multimedia feedback network, in one embodiment of the invention.

To explain an embodiment of the discovery process in more detail, attention is now directed to FIG. 2C that illustrates the live multimedia feedback mechanism and network (LMFN) that is used in the Discovery process, in one embodiment of the invention. The LMFN enables the coordination of a plurality of users that are discovering, broadcasting, indexing, providing feedback to and on, and editing live events to produce user-developed, personalized, live, edited broadcasts of events around the world in real-time. The LMFN achieves this objective by connecting multiple capturing devices and the corresponding device operators (GUs) to multiple mixers and consuming users of real-time live multimedia. The LMFN further allows for discovering, indexing, ranking, providing feedback to and about, switching, mixing and presenting streams/channels of real-time live multimedia, customizing or personalizing multimedia content presentation based upon social relation and live feedback, properly recognizing and rewarding popular content with greater exposure and compensation, thereby satisfying consuming users' demands for interactive control. The LMFN includes a plurality of multimedia Generating Users (GUs) 200 with their multimedia capturing devices, communication networks, a feedback engine (FE) 400, the multimedia Consuming Users (CUs) 300 and Mixers with their multimedia receiving and feedback devices.

As mentioned earlier, the GUs 200 are equipped with multimedia capturing devices such as video cameras or mobile phones equipped with video cameras to capture and transmit multimedia content in real-time to the FE 400. The capturing devices are not restricted to video cameras or mobile phones with video cameras for capturing video content but can be extended to include other devices that can capture and transmit over the LMFN video and other forms of multimedia content such as text, vibration, audio, to name a few. The GUs 200 initially register with the LMFN so that they have access to the communication network to transmit the captured multimedia content. A plurality of registered GUs 200 may be covering a single event or topic or location, time, and/or collocated people, objects, and/or events occurring and/or likely to occur at the site of capture, and/or the person and/or organization operating the capture device at the same time. The multimedia content transmitted by the GUs 200 include a set of metadata that provide pertinent information related to the GU 200 and to the multimedia content of the captured event/topic. The registered GUs 200 may begin transmitting the multimedia content based on an incentive (economic or social) or otherwise. A plurality of GUs 200 from one location or event may produce a multitude of simultaneous streams of multimedia content covering that location or event from many angles encompassing different perspectives.

FIG. 2C illustrates two sets of GUs 200-1 and 200-2 covering the same event from two different locations (location one and location two) with each set of GUs generating streams of multimedia content covering many angles and perspectives, at a given time. The sets of GUs, 200-1, 200-2, transmit their own multimedia content along with corresponding metadata to the FE 400 from their respective locations. The location of the GUs 200 can be determined in a number of ways, such as through a geo-locator mechanism such as a Global Position System (GPS) device embedded within the multimedia capturing devices of the respective registered GUs 200 or by explicit location coding from GUs 200 or through other means such as cell tower ID mapping, cell tower triangulation, Bluetooth location beaconing, WiFi triangulation, etc.

The metadata associated and packaged with the multimedia content for a specific event/topic may be contextual based or consumption based. The contextual based metadata relate to the specific event/topic and/or to context of the specific event/topic such as the location, time, and/or collocated people, objects, and/or events occurring and/or likely to occur at the site of capture. The metadata may be generated by the GUs, by the FE or by the devices used by the GUs or in the specific content within the multimedia streams. These contextual based metadata may include information related to location, time, and/or collocated people, objects, and/or events occurring and/or likely to occur at the site of capture, interested sub-group of CUs, GUs and Mixers, relationships of CUs, GUs and Mixers with reference to specific event/topic, and specifics of the event/topic or content being captured and transmitted. The consumption based metadata may relate to events/topics that are generally popular or are of interest to general public without a specific request for such information from any CU, GU or Mixer user groups or may relate to the consumption patterns of an interested sub-group of CUs, GUs and Mixers.

The FE 400 handles the multiple incoming streams from the different GUs 200 covering the same event or topic and other events/topics, ranks and orders them according to the GUs 200, event/topic, and other criteria based on the metadata provided with the multimedia streams and makes the streams available to the public CUs 300 or to specific User groups or types of Users in an organized fashion. As used in this application, a User is any one from a CU user group, GU user group, Mixer, Sponsor, Advertiser or any other User that has an interest in the content of the multimedia streams. In addition, the FE 400 may track multiple and/or overlapping locations of GUs 200 for the specific event or topic or other events/topics being published by numerous GUs. The FE 400 compares the received multimedia streams with each other to determine correlation between the streams and organizes the multimedia streams by filtering based on the correlation, the contextual metadata and consumption metadata. For instance, in one embodiment, the FE 400 may organize the multimedia streams by filtering and grouping the multimedia streams together based on the correlation, such as location of the GUs 200 with respect to specific events/topics. The metadata information may be used in grouping and prioritizing the multimedia content. The FE 400 forwards the organized multimedia streams to the Users including CUs 300 who are interested in the multimedia content.

The FE 400 includes two primary functions—Stream management and Feedback management. These two functions can be integrated into one FE 400 or maybe two separate FEs 400 that run complimentary to each other through Application Programming Interfaces (APIs). In the embodiment illustrated in FIG. 2C, the two functions are integrated into one single FE 400.

In one embodiment, the FE stream management module includes a Stream Intake Manager (SIM), a Stream Ranking Manager (SRM) and a Stream Publication Manager (SPM) to receive, rank, organize and publish the multimedia streams. The SIM is responsible for receiving new multimedia content streams and new GU User requests, and for validating the GU users and content of multimedia streams. The validated multimedia streams are then passed to the SRM by either converging the multimedia streams into a single multimedia stream source or as a composite multimedia stream source.

The SRM is responsible for reviewing, cross-referencing and populating approved and validated multimedia streams received from the SIM into various indices, maintained and used by the FE 400 to publish and distribute streams to CUs 300. The SRM uses the explicit metadata of the multimedia streams as well as other properties associated with the multimedia streams and GUs to dynamically organize each of the multimedia streams in one or more ordered lists and in one or more categories related to the event/topic. Over time a multimedia stream's place in the ordered list or validity to belong to a specific category may change based on a LMFN cycle that is constantly updating the multimedia stream's ranking or the SIM that is constantly changing the availability or validity of the multimedia stream. The SRM forwards the indexed, ordered and ranked multimedia streams to the SPM.

The SPM is responsible for distributing the ranked, ordered and indexed multimedia streams to the CUs 300. The SPM provides these multimedia streams to the CUs in various formats based on a plurality of search preference. The search preference may define the user's search criteria (user criteria or user preferences), interest type for the multimedia content, location, etc. The search preference, thus, may include information such as event or subject type, length of event to be captured, location of the event to be captured, type of multimedia format desired, consuming users' preferential status, user subscription status, type of multimedia content, metadata/tags associated with the multimedia content, period when the multimedia content was captured, capturing device's hardware preferences, location of the receiving and capturing devices, network-affiliation, demographics, to name a few.

In one embodiment, these multimedia streams are distributed to CUs 300 from FE 400 based on an initial search request from the CUs 300. In this embodiment, the search request includes search preferences of the CUs 300. The multimedia streams are organized by indexing, ranking, ordering and filtering based on the search preference so that the multimedia streams may be presented at the receiving devices of the CUs 300 in an organized manner. The organized multimedia streams are then bundled based on a presentation criteria associated with the receiving devices of the CUs 300. The presentation criteria define the requirements for rendering the multimedia streams on the receiving devices and are driven by user criteria, network criteria and the receiving device's limitations. The presentation criteria may include length of coverage of the multimedia content, format in which the multimedia content is to be presented for rendering, type of multimedia content, network bandwidth, etc. The formats that are available to the CUs may be based on the user criteria and may include multiple stream view, map-based view, or single stream view. The CUs 300 receiving devices may include appropriate interfaces to render the multimedia streams on the receiving devices in the desired format.

Figure 3A:
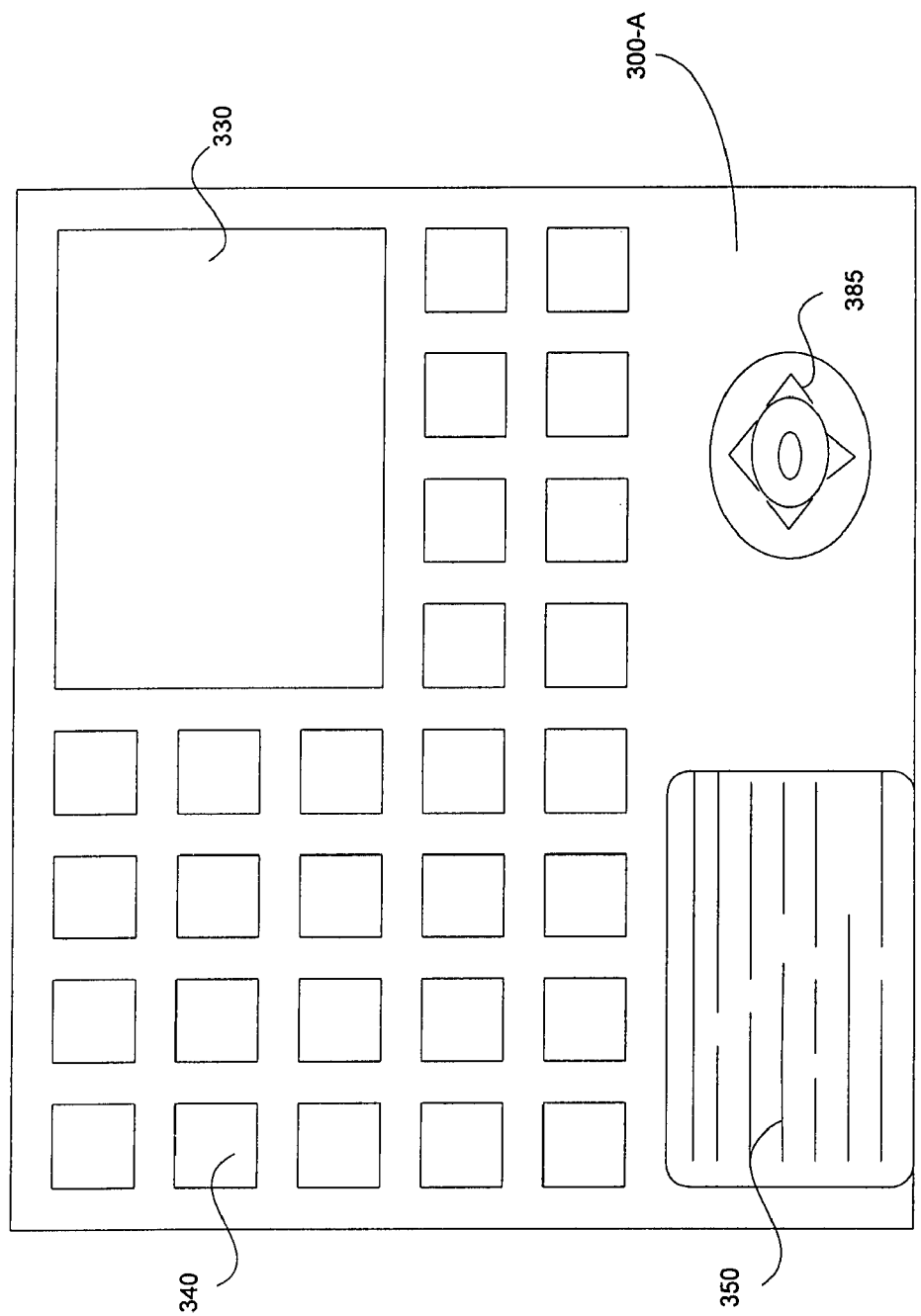
FIG. 3A is a schematic view of a multi-stream interface module of FIG. 2C used in capturing multimedia content, in one embodiment of the invention.

FIGS. 3A through 3D illustrate the various format interface pages that are available at the CUs 300 and Mixers receiving devices for viewing the multimedia streams transmitted by the FE 400. The format interface pages may include Multiple Streams Interface (MSI), Map-Based Interface (MBI) and Single Stream Interface (SSI), each of which are configurable and can be made public or private depending on the status of the GUs and/or CUs involved. FIG. 3A illustrates a Multiple Streams Interface 300-A (depicted as MSI 300-A in FIG. 2C) available at the receiving device to view multiple streams transmitted to the CUs 300, in one embodiment of the invention. As shown, the MSI 300-A includes a large view window 330 to view selected multimedia content and has configurable rows of small windows 340 within which component streams are playing in real-time or in substantial real-time (i.e. with slight buffer through the FE).

The embodiments of the invention describe operations that occur in substantial real-time. "Substantial real-time" as used herein shall be broadly defined to include operations that are either real-time or appear to be real-time. Further included within the definition of substantial real-time are embodiments where real-time operation is not possible due to delays in transmission and/or processing. Example delays may produce processing that include a slight buffered delay so that viewers and capturers of the multimedia content are presented with environments that appear to be real-time, although minor delays that are noticeable or barely noticeable do not depart from the broad scope that should be applied to the definition of substantial real-time.

Referring back to FIG. 3A, an interactive screen 350 (otherwise called the view window), to provide feedbacks, and a screen control 385 are also provided to allow the consuming user to navigate through the various options available on the CUs receiving devices. The CU can thus watch as many streams simultaneously as their screen real-estate will allow them to open, and the FE's 400 SPM will continue to track and coordinate the delivery of the streams even as the CUs may customize or re-organize the individual streams within their own MSI.

Figure 4:
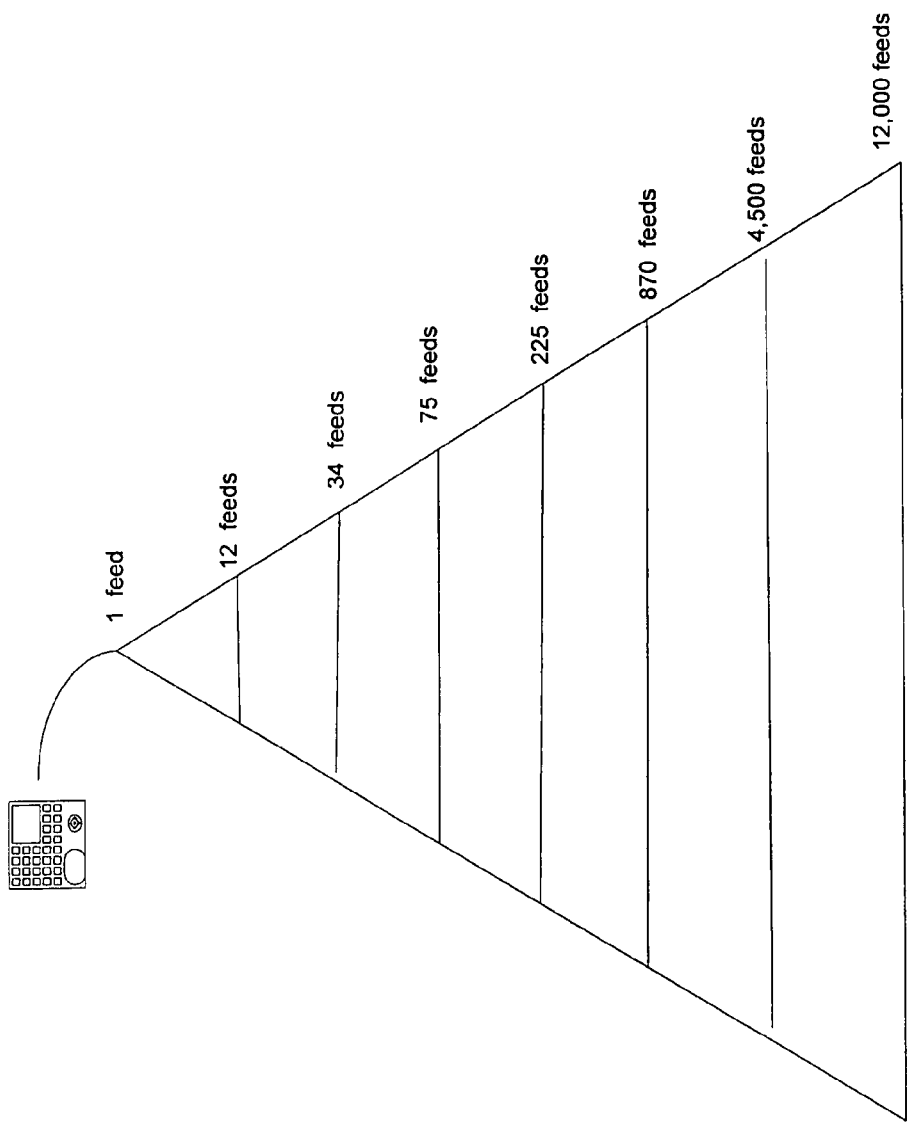
FIG. 4 illustrates a simple overview of results from a filtering mechanism used in filtering a plurality of multimedia content feeds related to an event, in one embodiment of the invention.

As mentioned earlier, a plurality of registered GUs 200 may be capturing and transmitting a plurality of multimedia streams for a particular event/topic. The FE 400 receives the plurality of multimedia streams (which can run into several thousands of streams) and organizes the multimedia streams based on certain organizing and filtering criteria defined at the FE 400. A sample multimedia stream pyramid is shown in FIG. 4, in one embodiment of the invention. The base of the pyramid represents all the multimedia streams that have been received at the SIM. The FE 400 filters and organizes the multimedia streams iteratively based on the content and search preference and provides the filtered streams to the CUs in a multiple stream view format. For instance, a total of 12,000 multimedia streams are received initially, as indicated by the base of the pyramid. These multimedia streams are iteratively filtered to reduce the feeds (12,000->4,500->870->225->75->34->12->1). The filtered streams are then transmitted to the CUs for rendering on the receiving device. In one embodiment, the filtered streams are transmitted as a single composite stream. The composite stream may include the top two tiers of choices being rendered in the set of smaller windows with the top most single stream being rendered in the view window or may include top three tiers depending on the availability of real-estate space on the receiving device and the relevancy of the multimedia streams to the CUs request/desires/tastes.

In one embodiment, the MSI is completely configurable by the CUs to populate their own screens, and the CUs can use search and discovery tools to help select streams to add to their personal MSI. CUs can do this one at a time, or by selecting specific groups of streams (e.g., most popular, etc.), or by designating a portion of the CUs' screens for display of as many of the top streams in a particular popular streams group that will fit within the space selected by the CUs. In this way, the MSI can serve as a personal stream homepage that is fully configurable by the CUs to any number of user-defined or network-offered categories of streams.

In another embodiment, the MSI is fully automated and is populated by the FE operator or by other third-party affiliate publisher to each specific CU. In this embodiment, the MSI may be personalized by the FE operator (not by the CU, as in the previous embodiment) based upon GU, stream or CU attributes or data. In this way, the FE operator can create a plurality of specialized MSI templates or types for use in creating a better user experience for the respective CUs. The MSI templates may be designed based on targeted age groups, income levels, and/or interests of CUs. In addition, the MSI templates may be geared to specific subjects, such as financial services, sports categories or teams, real estate, various news organizations or political affiliations, business industries or professions, etc. The MSIs may rank and sort multimedia streams based on many criteria, such as content based criteria like color, lighting, shape, motion, focus, etc. and common metadata like being in the same location, viewed by one's social network, captured by a team of GUs, etc. In one embodiment, the FE operator may populate a selection of icons representing specific MSI template pages, on the LMFN's starting page. The MSI page would then be populated with ranked lists of currently available streams that is available for selection and feedback by CUs.

The receiving device's MSI may use the plurality of controls and options to provide feedback to GUs through the multiple windows in the MSI that are currently playing the GUs' streams. Feedback mechanism may vary depending on user preferences and/or MSI template, and may include mechanism such as one-click affirmation mechanism, a double-click affirmation mechanism, click-and-drag affirmation mechanism, mousewheel mechanism, etc., to indicate CU feedback to either change the angle, continue focusing on the same subject or provide more in-depth coverage of the subject. For instance, a CU watching an MSI page may interact with the MSI page by clicking on a stream to indicate his/her interest in the particular stream. As the LMFN is a real-time system in which the CUs have the power to dynamically change content they are viewing, the CUs can increase the ranking and prominence of the particular stream in the composite streams and in MSI template populations by the clicking action.

In another example, CU can click or click-and-drag on a stream directly in the view window to indicate to the corresponding GU to change their capturing device's angle or topic of that stream. This click or click-and-drag action may be directed to either onscreen content or off-screen content that the GU should focus on. These actions from the CU are considered by FE as a vote for ranking and popularity as well as a vote for angle or topic change. The FE aggregates all votes (CUs actions) over some pre-defined interval and communicates the aggregated feedback to the GUs in the form of suggested instructions. For instance, the suggested instructions may include instructions to move the capturing device in specific directions, a unique sound to indicate specific direction, or a viewing overlay that may appear in the GU's viewfinder with a blinking arrow indicating the aggregated CU feedback, or a "heatmap" overlay that may appear in the GU's viewfinder to indicate various levels of interest on the various parts of the broadcast content, to name a few. In one embodiment, the MSI includes a graphical object including directional tabs and buttons to indicate common camera actions, filters, or other configurable options provided by the FE 400. CUs can use their mouse to interact with this graphical object in order to control their feedback or manipulation of a particular multimedia stream or set of multimedia streams currently selected for feedback.

In one embodiment, the MSI also includes real estate for mixing and communication tools for CUs, like an Instant Messenger (IM) window for communicating with other CUs connected to the same stream or by communication tools offered in the MSI template or by user-selected IM-communication preferences, such as a live voice or multimedia communications circuit created over telecommunications networks, Voice over Internet Protocol (VOIP) or other communications tools. In one embodiment, for example, the LMFN could be used by multimedia production teams with some members in the remote field acting as GUs and others at another remote location acting as CUs on the network. In this embodiment, the CUs also act as producers guiding the GUs to coordinate the multimedia streams with other GUs in the field. In this embodiment, the GUs and CUs can configure their MSI and/or MBI to be limited to team members and communicating among team members using closed, private communications across the LMFN.

Figure 3B:
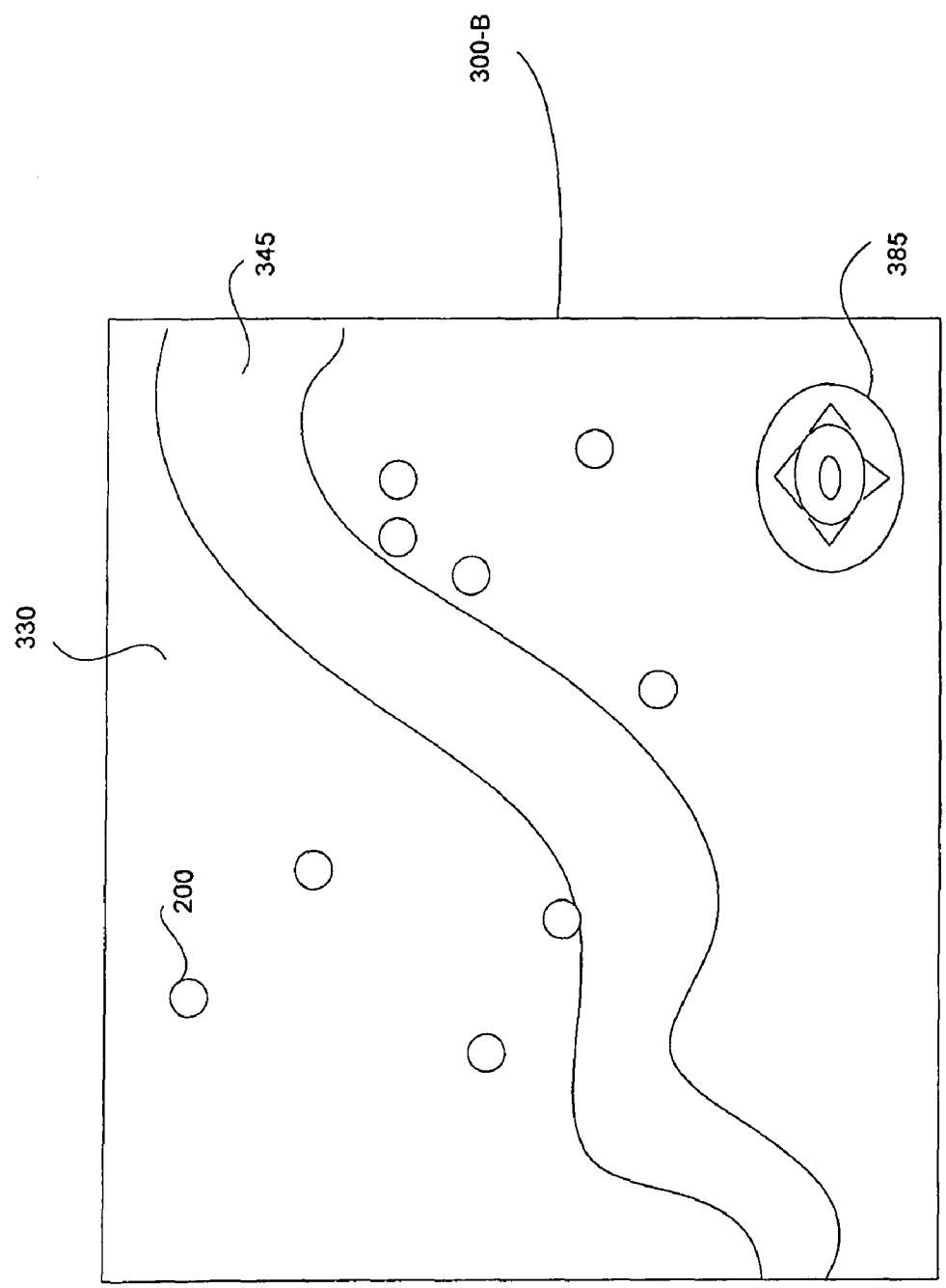
FIG. 3B is a schematic view of a map-based interface module of FIG. 2C used in identifying capturing device location points/points of interest at a particular reoccurring event using a map-based interface, in one embodiment of the invention.

FIG. 3B illustrates a map-based interface (depicted as MBI 300-B in FIG. 2C) that includes a large view window 330 for viewing a map 345 related to an event/topic, in one embodiment. The view identifies a plurality of capturing devices 200 that are currently available at the event that are either ready to capture the event/topic or are already capturing the event/topic and transmitting. The view window 330 includes a navigation control 385 to help navigate through the screen. The MBI is an interactive web page or device interface that includes an actual or approximate map of a cluster of GUs in real-space. The MBI can be to scale or relative based on the number, ranking, type and density of active GUs (registered) on the LMFN at any given time. The MBI can also be global or channel, category, GU or context/event specific as offered by the LMFN operator or created through the CU's queries or interactions with the base MBI.

In one embodiment, the MBI indicates GUs and their angle of media capture with a small icon and directional arrow overlay. By clicking-and-dragging, the CUs can scroll the scene of the MBI and the MBI will re-draw as necessary to show the change in relative position among GUs as well as any new GUs or Topics available in that direction. Likewise, MBIs may include a "zoom bar" (as known in the art) for changing the perspective of the MBI. At regular intervals all MBIs will redraw to update the changing location or angles of GUs in real-time and space. In addition to displaying the state of GUs on an MBI, the iconic representation of the GU's position, orientation, focal length, and field of view may be manipulated by a CU when providing a feedback to the GU. This state information about the GUs in the MBI can be animated, if sampled and refreshed often enough.

In one embodiment, if the zoom context is small enough to show a limited number of GUs, the MBI may include "call-out" boxes/windows in which the current multimedia stream from that GU is being shown in the MBI. For example, an MBI for GUs at a marathon might show the entire course with icons for all active, valid, selectable GUs, but may also have call out boxes for a GU at the start-line, a GU at the finish-line and a GU at a highlighted location in the middle of the course. Future and past information about GUs, their position, orientation, focal length, and field of view, as well as objects, people, locations at a scene (present as well as previously broadcast) can also be overlaid on an MBI to support decisions about what, where, who and when to broadcast.

At any point, a CU can select any icon for a GU on the MBI and immediately load the corresponding stream from the GU in an SSI, provide feedback to the GU through the MBI directly or add the stream to a new or existing MSI. Alternatively, the CU can recommend or request a new multimedia stream from a specific GU or for a specific event/topic. In one embodiment, a double click on a GU icon in an MBI will load that stream in an SSI, whereas a click-and-drag of a GU's icon allows the CU to add the GU to their current default MSI. Other ways to represent information to the GU or CU about the position, orientation, focal length, and field of view of the GU as well as information about relevant locations, events, people, objects, etc. that could be visualized on an MBI, may be used to represent the feedback information as an overlay on the broadcast stream on the GUs capture device and/or the CUs receiving device where the broadcast stream is overlaid by the feedback stream, composited, and/or inserted into the live video of the broadcast stream.

Figure 3C:
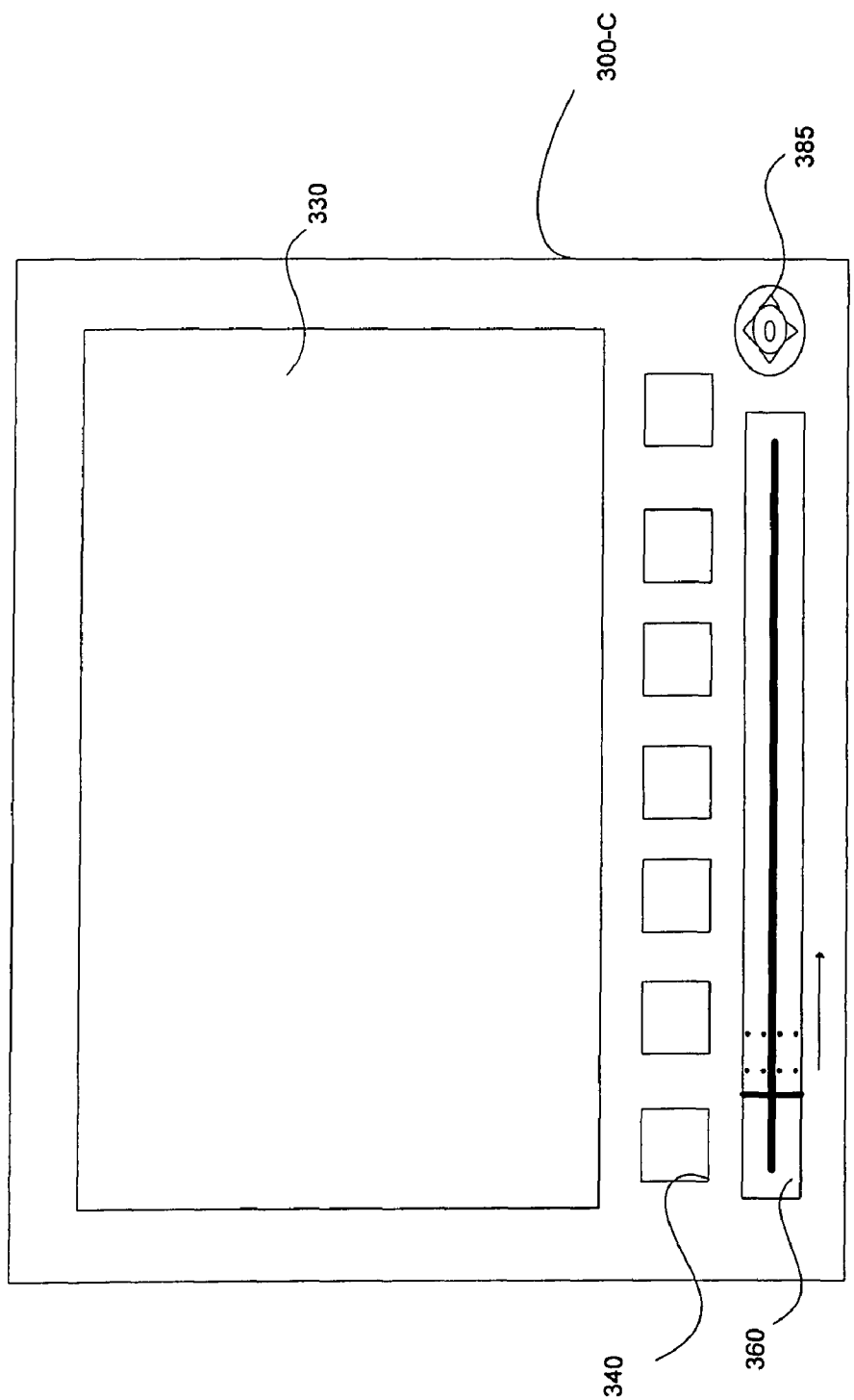
FIG. 3C is a schematic view of a single-stream interface module of FIG. 2C used in capturing multimedia content, in one embodiment of the invention.

FIG. 3C illustrates a single stream interface (depicted as SSI 300-C in FIG. 2C) that is provided to the CUs and Mixers, in one embodiment of the invention. The SSI 300-C includes a large view window 330 that enables high resolution rendering of the selected multimedia stream. This multimedia stream may be of live multimedia content coming from one GU or it could be a composite stream auto-created by the LMFN, by other CUs or by the viewing CUs themselves. In one embodiment, the SSI includes a main view window 330 for viewing the single selected multimedia stream and a series of smaller windows depicted as thumbnails 340 arranged underneath indicating other multimedia streams available from the CUs, GUs, MSI or related to the single multimedia stream currently playing in the SSI, and/or recently viewed segments of the broadcast stream. The SSI 300-C may further include a timer control 360 that allows a CU to retrieve appropriate previously viewed multimedia streams related to the event based on the setting on the timer control. To provide the capability of retrieving previously viewed multimedia streams, the multimedia streams may be stored locally on the receiving device or in a remote database accessible to the CU through the communication network. The SSI includes navigation controls 385 for a CU to interact with a current multimedia stream as well as provide feedback and/or suggestions back to that multimedia stream's GU, other GUs, related CU or other CUs and to receive feedback from the GUs or CUs. In one embodiment, since the SSI is also the view from which any multimedia stream is given the largest amount of screen real-estate, it is possible to allow CUs to use their mouse to select topics, subjects or objects within the frame of a current stream and communicate feedback or direction to the GU about that selected topic, subject or object being captured by the GU.

Figure 3D:
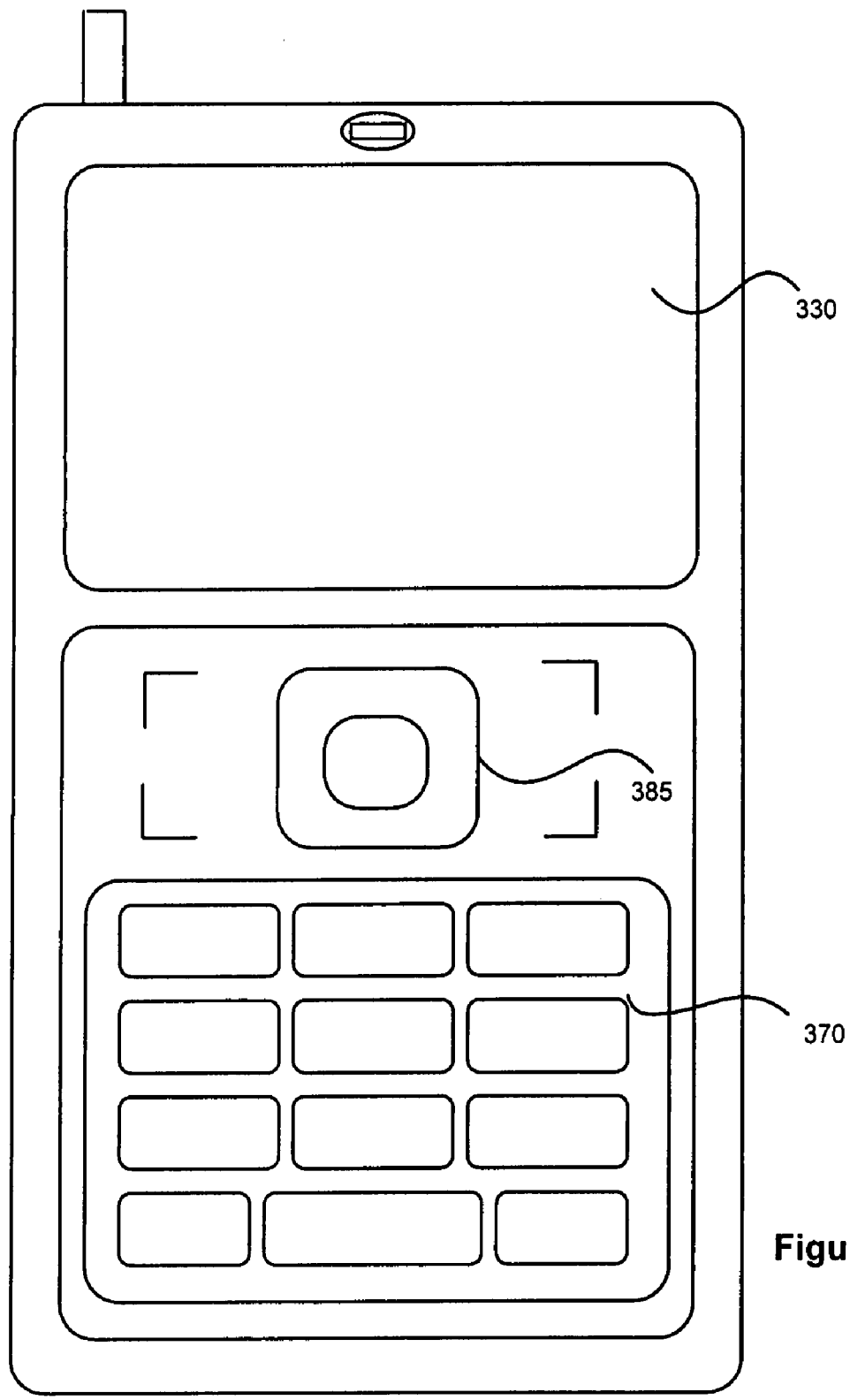
FIG. 3D is an overview of a mobile-phone based interface module of FIG. 2C used in capturing multimedia content, in one embodiment of the invention.

FIG. 3D illustrates a representation of a mobile phone device with a viewer interface to receive and render the multimedia streams, in one embodiment of the invention. The function of the various components/options on the mobile phone receiving device has been explained in detail with reference to FIG. 16 above.

Continuing our reference to FIG. 2C, the discovery process continues with the CUs providing real-time feedback to the GUs, other CUs and Mixers through the feedback management module of FE 400, in response to the real-time multimedia content rendered at the CUs receiving devices. The feedback management module includes a Feedback Intake Manager (FIM), a Feedback Analysis Manager (FAM), Feedback Delivery Manager (FDM) and a Transaction Manager (TRM) working together to process CUs interaction through MSI, MBI, or SSI and communicate that feedback to GUs, CUs, Mixers and other Users.

The FE 400 facilitates two primary feedback loops (regular channel of communication and direct channel of communication) that once launched, runs independently until logically resolved within. Regular channel of communication is when the CUs, GUs, Mixers and other users communicate with each other through the feedback management module. The feedback management module, receives the feedback from the users, aggregates, organizes and forwards the feedback to the appropriate user. In addition to the regular channel of communication between the CUs and GUs, the feedback management modules, unlike stream management modules, include human-based communication interactions between GUs and CUs through CU to GU direct circuits. Since the feedback management modules facilitate communication of feedback in some form to a GU and follow-up response from GU, the feedback management module may include a related or third party communication network.

The feedback management module reacts to the actions, interactions and communication events between and among all GUs, CUs and Mixers in order to modify individual or related stream's ranking and population availability in component pools for composite streams. In order to provide rich user experience during multimedia rendering, the LMFN is configured to allow real-time communication amongst the user groups to facilitate real-time experience of influence by CUs on GUs. The feedbacks amongst user groups may include direct interaction or interaction through FE between CUs and GUs, between CUs and CUs, between CUs and Mixers, between GUs and GUs and/or between GUs and Mixers. The feedbacks among user groups may take many forms such as direct device feedback, text, graphical, audio, community rating, live popularity, vibration, temperature or any combinations thereof, so long as the various forms may be captured by the receiving devices and transmitted.

GUs and CUs are distinguished by various roles/types and tags associated with each user and may be linked to each other and to various topics by various relations and organized into groups that can further be linked and grouped. A typical GUs role may include any one or combination of capturing-device operator to capture shots of events/topics/people/activity/object/product/brand or service from various angles, Mixer to mix the captured multimedia content with appropriate advertisement content at appropriate times, be positioned at certain locations for an upcoming event, commentator, director and tagger. In one embodiment, the appropriate advertisement content may be chosen and placed at appropriate locations within the multimedia stream by a GU or Mixer based on related contextual content of the multimedia streams. A typical CUs role may include viewer, commentator, switcher, Mixer, transcriber, tagger, director, inserter of advertisement units, and adder of hyperlinks to objects in the multimedia streams. The communication and feedback amongst the various users may be of different modalities, such as text, numerical, voice, audio, graphical, iconic, video, vibration, temperature, etc., that can be captured and transmitted.

The feedback exchanged between the users may deal with issues of scale and context. The scale issue deals with how much feedback is being produced and consumed and by how many people. Context issue deals with contextual consumption and production of feedback. The FE 400 aggregates, filters, summarizes, arbitrates and transcodes prior to making the feedback available to the users (GUs, CUs, Mixers). Additionally, the FE 400 coordinates the request from a CU and facilitates identifying a set of GUs to service the CU's request. For instance, the CU may select a location within an MBI that does not contain a GU and the FE feedback management module will facilitate a real-time call to the closest set of GUs within a limited geo-threshold of the location identified by the CU for a potential change of multimedia content. The FE 400 sends a real-time communication to the set of GUs and reports the GUs response (acceptance or denial) back to the CUs from whom the request originated. In instances where a plurality of CUs are placing such geo-based GU requests to the FE 400, the LMFN operator may step in to smooth and organize requests into categories or generalities to provide a more interactive user experience. In addition to real-time feedback, the LMFN can receive proactive requests for places/events/people/topics/objects that CUs or GUs wish to have broadcast by the LMFN. These requests can both help GUs decide which topics to seek out to broadcast as well as serve as an initial set of targets to be on the look out for or seek out at an event.

Referring back to FIG. 2C, the FIM is responsible for aiding the browser display or device display of the MSI, MBI, SSI or any other presentation of streams to CUs and providing some or all of this data to the FAM. The FIM also controls and gathers any and all user actions, such as mouse-over actions, click actions, click-and-drag actions and other interactive forms, that can be tracked from the CUs based on the multimedia content. The FIM approves and validates the CUs, CUs actions and gathers these actions as CUs feedback and forwards the gathered feedback to the FAM.

The FAM receives the raw or modeled data from the FIM and is responsible for reviewing, cross-referencing and populating approved and validated feedback associated to a specific or aggregated CU, topic and any other model or criteria specified by the LMFN operator. For example in one embodiment, the operator may utilize a revenue optimizing model that would weigh subscribing CUs feedback stronger than guest or public CUs feedback. The FAM gathers the feedback and creates a real-time dynamic logical representation of CUs interactions with multimedia streams, with GUs and with other CUs and Mixers based on specific model/criteria chosen at the FAM. The FAM may use more sophisticated positioning information about GUs to organize the feedback by instrumenting the capturing device and/or analyzing the broadcast content to determine not only the position of the GU, but the vector of attention between the GU and the broadcast subject, thereby effectively determining the three dimensional position of the GU, the broadcast subject and the image plane the GU is producing and the vector between the GU, the broadcast subject and the image plane. This attention map helps in depicting a weighted representation of the actions, communications, and stream-voting/interaction behavior of both GU and CU on the network.

To facilitate interaction between GUs and CUs, the FAM uses both the metadata associated with the multimedia content as well as the derived properties of the multimedia and associated GUs and CUs to place every feedback event into one or more databases associated with the GUs, CUs, Mixers, Sponsor, Publisher, or any other users (including third-party users) on the network. The databases are then made available for querying by other FE components to make ranking or aggregating decisions in real-time. After a pre-set threshold of time defined by the scale of CU interactions, the FAM provides long-term data based upon CU actions or GU responses to the TRM and initiates a call to the FDM for immediate delivery of aggregated or individuated feedback to all GUs. In essence, the LMFN is basically computing the spatiotemporal path of attention between any given CU and the events unfolding in the real world as mediated by the various components of the LMFN.

The FDM receives the aggregated response and interacts with the communication network and other communication carrier networks that enable direct communication with GU. The interaction may be synchronous or asynchronous and include all known forms including MSI, MBI, SSI as well as GU-side interface including voice, multimedia, text, IM, etc.

In instances where a GU broadcasts through the LMFN but no CUs interact with their streams, no long-term feedback data is generated. In such instances only the GU and multimedia stream databases are updated.

In a LMFN process, a CU provides a continuous feedback to the GU in response to the multimedia streams, the GU responds with adjusted multimedia streams and/or feedback and the CU responds again and the process goes on till the GUs seize to capture multimedia content or the CUs lose interest or exit. The TRM gathers data to update individual GU and CU profiles as well as aggregated GU, CU and any related sponsor data generated by the events/topics. The TRM may maintain its own user and content ranking and scoring database based upon transaction events or it may share or provide this information to other LMFN modules or process to maintain.

Figure 5:
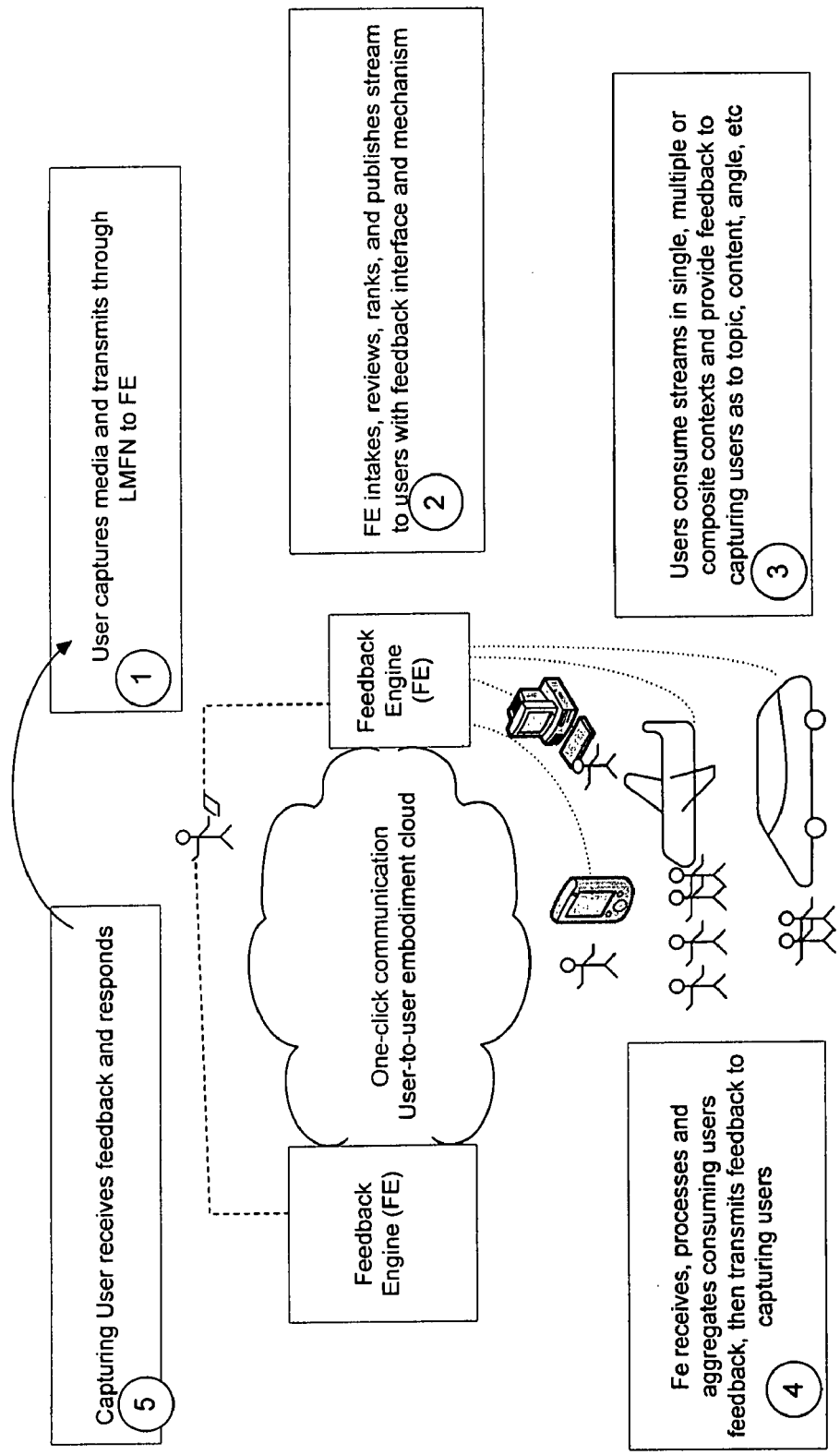
FIG. 5 illustrates a live multimedia feedback cycle, in one embodiment of the invention.

With the aforementioned detailed description of the various modules within the feedback engine 400, a sample LMFN loop process or Feedback cycle is described with reference to FIG. 5, in one embodiment of the invention. The cycle begins with the GUs capturing and transmitting multimedia streams to FE 400 through the communication network. The FE 400 intakes, reviews, ranks, and publishes multimedia streams to interested CUs with feedback interface and mechanisms. As shown, the feedback interface mechanisms may be of any form so long as they are capable of receiving and forwarding multimedia content transmitted by GUs. The multimedia streams may be provided as a single, multiple or composite streams. The CUs consume the multimedia streams and provide feedback to GUs related to topic, content, angle, etc. The FE 400 receives, processes and aggregates CUs feedback and transmits the feedback to GUs. The GUs receive the feedback and respond with modified or new multimedia streams and the cycle goes on until the CUs seize to view the multimedia streams or the GUs stop capturing and transmitting the multimedia streams.

II. Switching Process:

A Switching process is defined as switching between multiple live multimedia feeds in order to produce a composite stream in real-time based upon live feedback from Users. The term "Switching," as used in the application, should be broadly construed to define a process to enable focusing from one source of live multimedia content to another source of live multimedia content. The switching can be configured to be performed automatically within the course of viewing multimedia content using a pre-set preference list for a particular user or with an algorithm if the particular user is a member of a group that has more preferences. Although embodiments of the invention have been explained in detail using a particular type of switching technique it has to be emphasized other types of switching techniques may also be used. The switching capability encompasses any type of movement, transition, shifting, or placement of emphasis from one stream of live multimedia content to another stream of live multimedia content and such movement from content types to content types can be performed in any number of ways including fading-in, clicking on, turning into split screens, generating thumbnails within thumbnails, etc. Additionally, the switching process should be broadly construed to include any number of processes, algorithms, functionality code or hard-code that would enable the proper zoning into specific live media content at specific times depending on the desires, likes, tastes and preferences of specific consumers of the multimedia content.

The Switching process may be initiated by a plurality of CUs, a plurality of GUs or by a plurality of Mixers. The switching process enables production of composite stream in real-time based upon ranking of the captured media streams according to the number of multimedia consuming users and their feedback for each stream, including ways to cluster streams based upon popularity, location, subject content and user reactions. The Switching process encompasses multiple phases or levels of switching including switching during feedback by CUs, GUs or Mixers and/or during response from GUs and includes both automatic and manual switching.

Figure 6:
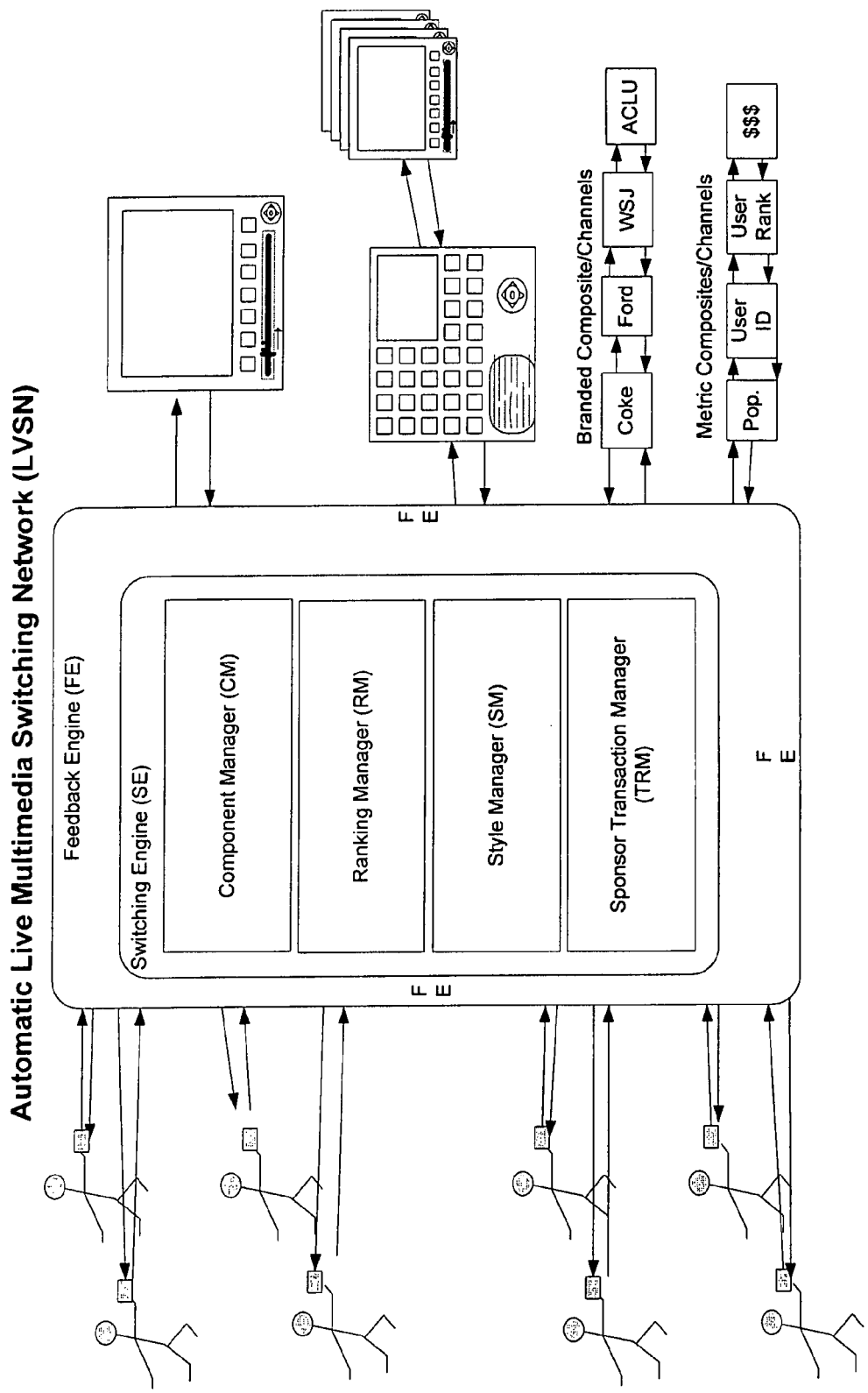
FIG. 6 illustrates a live multimedia switching network, in one embodiment of the invention.

To explain the Switching process in more detail, attention is now directed to FIG. 6 that illustrates the live multimedia Switching network (LMSN) that is used in the switching process, in one embodiment of the invention. The LMSN is similar in structure to LMFN and includes media Generating Users (GUs), GUs capturing devices, a Switching Engine (SE) within a Feedback Engine (FE), media Consuming Users (CUs), CUs receiving devices and communication networks. The GUs, CUs and Mixers are all registered users of the LMSN having a switching mechanism so that the users may be validated and identified during the switching process.

The multimedia content captured by GUs (also referred to as "Capturing Users") capturing devices are transmitted in real-time to the FE, where it is processed by the SE and then published by the FE to CUs in various formats including single-source feeds, multi-source composite feeds and feeds edited or remixed by FE operators, one or more SE or other interoperable third-party software. The registered GUs can be independent or associated with an organization, paid or unpaid, sponsored or unsponsored. The registered CUs can be casual or professional users, involved in media production or in talent industries or just a member of the viewing public or private user groups and can also be Mixers. The LMSN uses real-time and historical data on CUs and their preferences to personalize interactive multimedia environments.

In one embodiment of the invention, the Switching process begins on the LMSN and is initiated by a CU when the CU selects a particular multimedia stream. Although the present embodiment describes the Switching process being initiated by a CU, the Switching process may be extended to include initiation by other user groups such as GUs, Mixers, Advertisers, Content Sponsors, etc. In both the manual and automated switching process, the relativity of start for each CU selecting a stream is important to help rank CUs within the specific context of each stream. This ranking is used to help prioritize and weigh CU feedback to GUs based upon seniority and history.

The current embodiments of the invention use ranking algorithms to rank the multimedia stream based on each CUs viewing duration, each CUs view ratings and other factors. The ranking algorithms need to be intelligent enough to recognize a newly created multimedia stream vs. a multimedia stream that was created earlier so that the newly created multimedia stream is ranked appropriately. Thus, CUs and GUs exist in a dynamic network of social relations and Network feedback loop interactions that alter the ranking of CUs and GUs relative to each other and globally in relation to the current Network state and configuration. CUs can, thus, not only choose streams by active clicking on live feeds but can also programmatically specify streams to view in real-time or save for time-shifted viewing after creation based upon intended broadcast information made available to CUs through a search function. GUs upload broadcast information such as intended broadcast locations and events/topics or based on a schedule or content style. For example, a GU who does a live interview show from the local beach would register his/her "show" with the Network, and CUs could then either access the show live when broadcast, discover it time-shifted through a Network content search function, or even subscribe to the show so that the Network will deliver a notice (or a copy) to the CU once published. CUs can also post information to the Network for requested shows. For example, a CU who watches the show broadcast from the local beach, may know an old hot dog vendor the CU thinks deserves to be interviewed. In such cases, the CU provides prospective advice in the form of content suggestions (have this guest, do this interview), style suggestions (shoot the interview from under the wheel of the hot dog cart for cool effect) or any other feedback to the GU.

In one embodiment, CU could be paying customers who post Request for Proposals (RFPs) for multimedia coverage of their product, event, human-interest story or specific subject or topic, and GUs can search these offers through the Network to pick and choose their next paying production gig. Responding to the CU-placed RFP, a GU executes a form of contract to complete the agreed coverage, or broadcast multimedia production. The captured multimedia on the events/topics can be broadcast through the Network to a limited or private network of CUs, like a corporate sales meeting, or publicly like a shareholders meeting or town hall meeting, etc. Such broadcast multimedia may, thus, be facilitated for monetary compensation, Network compensation, professional endorsements or other non-monetary arrangements by the Network.

From the moment the CU loads the first login or MSI, MBI, or SSI page, all actions and interactions by the CUs are tracked and logged by the SE. The SE aggregates the CUs actions at the receiving device and interactions with other Users and feeds into a core ranking algorithm for multimedia streams throughout the SE's network of GUs and CUs connected in real-time. In one embodiment, non-real-time (asynchronous) interactions with streams on the network are also included in user and stream transaction logs, user rankings and future component default scoring. For instance, a GU with a multimedia stream that has a "successful hit" will begin with a higher ranking in the core ranking algorithm due to the weighting of that successful hit as an indication that a given CU explicitly or implicitly favored the multimedia stream captured by the GU. The core ranking algorithm may use tagging, view count, interestingness, social network filter of popularity by person, and geo-based metrics, to rank and prioritize the multimedia streams. The core ranking algorithm may additionally include metrics such as status of a User (paid sponsors vs. unpaid sponsors) to rank the multimedia streams so that paid sponsors (GUs) multimedia streams may be ranked higher than non-paid GUs. In addition to the aforementioned metrics the core ranking algorithm may be derived based on requests from Users, such as CU, Mixers, Network Operators, etc.

The SE also includes any real-time interactions including asynchronous interactions with a multimedia stream, which is a strong indicator of success, in user and stream transaction logs, user rankings and future component default scoring. As the specific multimedia streams accumulate successful hits, these multimedia streams increase in popularity and, therefore, may be considered for potential sponsorship or revenue generation. Additionally, these multimedia streams could be further used for developing new user social networks within the LMSN.

The SE aggregates these indicators (successful hits, etc.) and generates a dynamic network Quality Score (QS) that defines the reputation and value of these multimedia streams on the network. In one embodiment, if a multimedia stream is generated and shared among a select group of private GUs and CUs, then the QS value of the multimedia stream is calculated and ranked within the select group of private GUs and CUs but may not be made available to the public users on the network. In another embodiment, if the GUs and CUs work together as pairs, then such GUs and CUs QS are also aggregated.

Thus, the QS values of the users and multimedia streams are directly related to the popularity and the reputation, relationship and status of the users and the multimedia streams. Users can be CUs, Mixers, other GUs providing the multimedia streams or any other interested users providing feedback. The QS values related to the users may represent the popularity metric of each of the users and based on the QS values the users may be awarded increasing network rights and responsibilities as part of a reward system. For example, a tiered system of bronze, silver, gold and platinum users could be used to enlist the most active users in the process of community-creation, policy enforcement and feature-request-to-build customization options. These levels also can be scoped to specific functions of production, topics of broadcast, and/or sponsorship satisfaction. In one embodiment, the multimedia streams can be used for sponsorship, potential monetization, etc., based on the QS values of the respective multimedia streams.

In one embodiment of the invention, once a GU is assigned a particular QS value, the SE may assign the same QS value to any new multimedia streams generated by the GU at the time, irrespective of the popularity of the newly generated multimedia streams. After at least one feedback cycle has been processed, the default QS rating will be modified based upon the interaction data from aggregated CUs in real-time. The SE is, thus, a tuning mechanism allowing the LMSN operator to monitor creation and consumption of multimedia streams of events and consumption trends. The tuning mechanism of SE may also be used to maximize the operator's objectives, such as gain more traffic, sign-up more CU or GU, assign sponsors or promote specific content or Users. The QS can be computed both about the GU or CU as individuals as well as about the various subjects (places, events, people, objects, etc.) the GU broadcasts or the CU mixes. Various mixes of these two QS can create a combined QS which may be used for ranking the popularity of the multimedia streams. For example, a GU with a low QS may be broadcasting about a topic with a high QS while a GU with a high QS may be broadcasting about a topic with a low QS. All QS are relative to a given CU consuming the broadcast multimedia stream as well as computable for the entire network of CUs or various subsets of the network of CUs.

Referring back to FIG. 6, to assist in the switching process, the LMSN is equipped with one or more SEs responsible for generating, maintaining, and archiving (as appropriate) composite streams automatically. The SE generates composite streams based on the relative ranking of the multimedia content and users (both consuming and generating users) and hands the composite streams back to the FE for delivery to specific CU or sets of CUs. The SE accomplishes this by using one or more ranking algorithms to apply ranking models against style models. The ranking models may be supplied by the user transaction logs and network objectives, GUs or producing entities while the style models may be supplied by a switching Interface, network, user or other third-party. The generated composite streams include multimedia streams from multiple GUs as well as any text, graphics, overlays, audio, music, speech, or mash-ups of other multimedia content. Every composite stream created by an SE and handed to the FE is treated as a single stream. The composite stream includes metadata that defines the source and attribution data including component contributions that make up the composite stream.

An automated switching process begins with a SE getting connected to user data through the FE. In one embodiment, the FE instigates the SE's access to user data by providing a dynamic ordered list of live multimedia streams to the SE. In another embodiment, the SE initiates a request for user data to the FE and the FE responds with a dynamic ordered list of live multimedia streams to the SE. The dynamic ordered list may be generated real-time based on a ranking algorithm available to the FE. The user data provided by the FE may include such information as ranking, popularity, QS, etc. The SE then loads style models and component ranking models that are currently available to the SE. The style models provide the SE with templates for presenting composite multimedia streams created during the switching process. As and when new multimedia streams, generated and transmitted by a plurality of GUs, are received at the SE through the FE, the SE automatically compares the newly generated multimedia streams received from the GUs with existing multimedia streams from all GUs, indexes and queues for composite stream inclusion. A composite creator within the SE may use one or more ranking algorithms to apply style model against ranking model's ordered list to create individualized composite multimedia streams for each CU. SE forwards the individualized composite multimedia streams to FE to publish/distribute to the respective CUs. Upon distribution, the FE updates popularity list for the respective multimedia streams and GUs. SE adjusts composite multimedia streams based on new multimedia data received and the updated popularity list. The switching process continues until style model or FE call an end to composite plan production.

Figure 9:
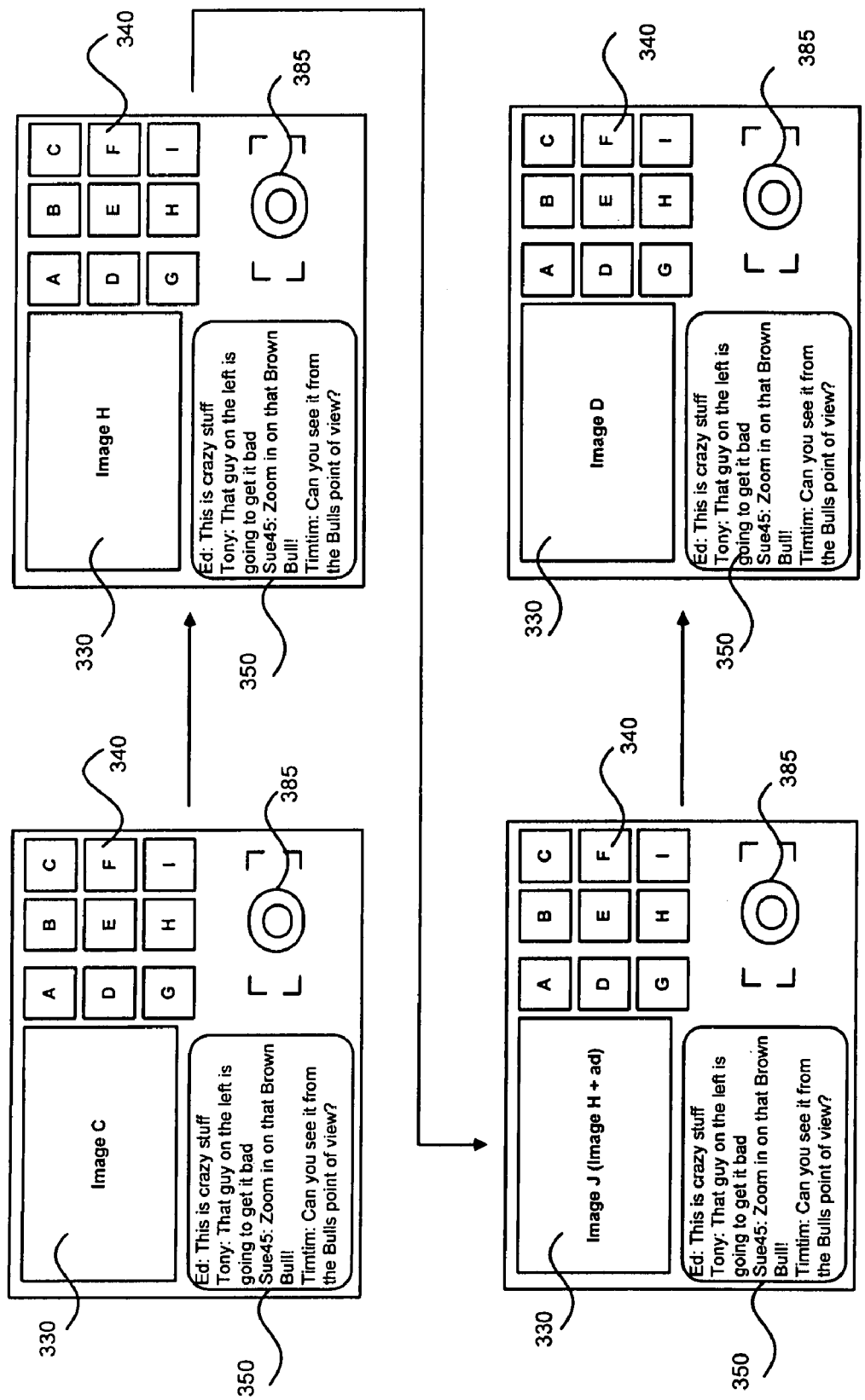
FIG. 9 is a block diagram illustrating multimedia content switching, in one embodiment of the invention.

An example of a composite stream undergoing Switching operation is illustrated in FIG. 9, in one embodiment of the invention. A CU receives a composite stream of multimedia content forwarded by the SE upon an explicit request by the CU. The CU receiving device renders the composite multimedia stream. The composite stream includes a plurality of multimedia content generated by a plurality of GUs. The multimedia content is rendered in a set of smaller windows alongside a main view window wherein a preferred multimedia content with overall higher ranking is rendered. For instance, multimedia content C (with higher relevancy ranking) is rendered in the point-of-interest (main view) window with the remaining multimedia content rendered in the plurality of smaller windows at the CU's receiving device. It is to be noted that the plurality of content is being transmitted real-time and the content in the composite streams may be constantly changing. Content C may be chosen based on the content's, User's or location popularity. During the Switching process, the content of the main window (content C) is switched with another content (content H) due to the transition of ranking based on CU's feedback. The feedback may be in the form of a click, click-and-drag or may take other forms. In one embodiment, the CU, GU or other user interested in the multimedia content may customize a multimedia content currently being rendered by inserting an advertisement or a comment to generate a customized multimedia content H. The comment may take any form such as audio, video, graphical, vibration, etc. The customized content H may be published or shared within a private group of CUs, GUs or may be shared publicly so other Users in the network may be able to render the customized multimedia content, based on the preferences set by the CUs, GUs or Mixers.

To assist in the switching process, the SE may include a plurality of modules. In one embodiment of the invention illustrated in FIG. 6, each SE includes at least a Component Manager (CM), Ranking Manager (RM), Style Manager (SM), and Sponsor Transaction Manager (STM) to oversee the generation of a composite stream for CU. Some SE may be tailored with specific CU or sets of CU in mind (e.g., mixes for children, adults, sports enthusiasts), while others may be tailored around specific GU or sets of GU (e.g. Michael Moore's latest Network project, GU talent discovery competitions, an individual's home movies only, etc.) or an SE can be agnostic as to GU or CU and instead use only data and metadata on the actual multimedia content in order to produce a composite stream.

The CM is responsible for receiving validated streams from the FE for use in the SE's composite stream creation pipeline, and indexing them for immediate and/or continued inclusion in possible composite streams. Since the LMSN includes both instrumented instances of composites already created, as well as relying on real-time composite creation ability, SE can optimize their own mixing of sources and styles based upon CU interactions in real-time to the just-created portions of the same multimedia stream. The CM keeps track of all source GUs for multimedia streams within any composite created by that SE, and turns over any newly available streams to the RM for possible inclusion in pending composites.

The RM is responsible for taking every available multimedia stream it gets from the CM and reviewing, cross-referencing and populating the multimedia streams into the various indices used by the SE to create composite streams. Using both explicit as well as derived metadata and path properties of the multimedia and associated Users, the RM places every potential stream onto one or more ordered lists and in one or more categories in a specific initial location.

Over time, a multimedia stream's place on the ordered list or validity to belong on a specific category's list will dynamically change based upon the LMSN cycle updating the multimedia stream's ranking or the CM dynamically changing the availability or validity of the multimedia stream. Once the indices of categories and ranked lists have been created, the RM makes the ranked and ordered list available to the SM.

Figure 7:
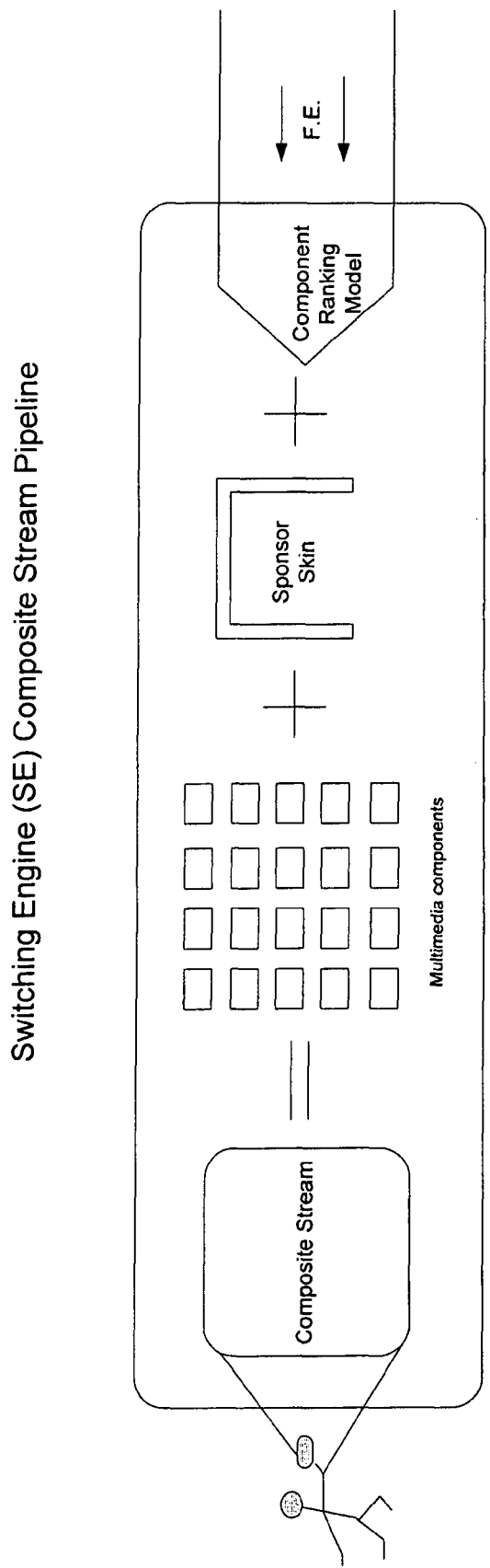
FIG. 7 illustrates a switching engine composite stream pipeline, in one embodiment of the invention.

The SM is responsible for assembling the actual composite by applying Style Model against the ranked lists and categories the SM receives from the RM for all available multimedia streams from GUs. The Style Model controls the visual appearance, the length of scenes, preference for transitions, soundtrack, graphics and other interactive or composite creative variables. The Style Model can be User-specified or created by the GU or LMSN operator. By combining several style models with several ranked lists, a multitude of resulting composites can be created through this system that all use the same original content. The SM may also feedback information to the other modules in the LMSN. A sample SE composite stream creation pipeline is illustrated in FIG. 7, in one embodiment of the invention. As shown, the SM integrates the component streams with the sponsor skin (to provide the look and feel of the page), Style Models (that define users preference criteria) and component ranking model to generate composite streams.

Figure 8:
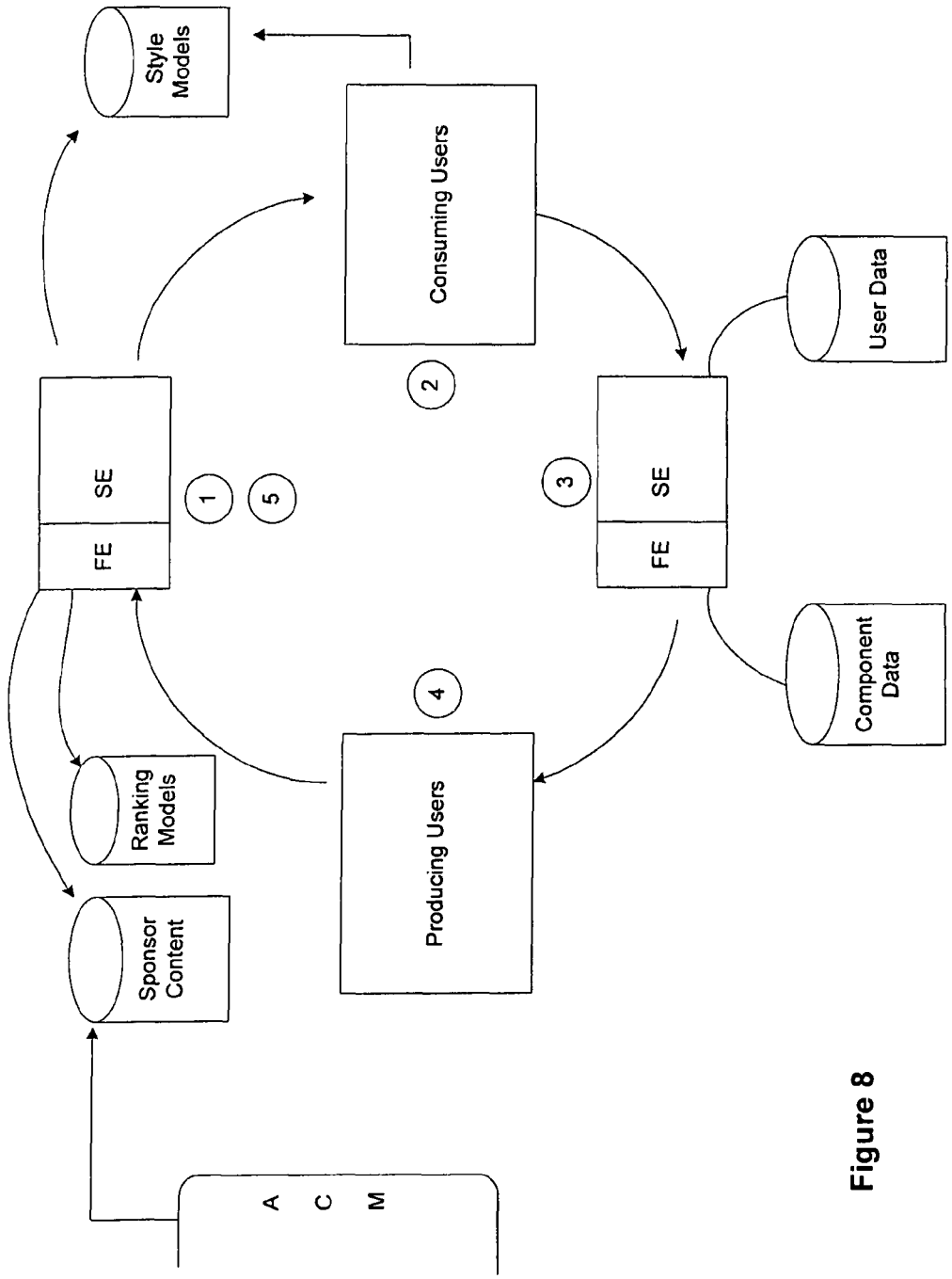
FIG. 8 illustrates a composite switching cycle and data flow, in one embodiment of the invention.

FIG. 8 illustrates a sample auto-composite switching cycle (LMSN loop process) as used in the Switching process, in one embodiment of the invention. The Switching process begins when User data is received at the SE through the FE. The SM in the SE applies the Style models, ranking models and sponsor content to appropriate content of the user data and generates composite streams that are forwarded to the CUs through the FE. The CUs provide the feedback on the composite streams to the SE through the FE. The SEs forward the feedback to the GUs for customizing the multimedia streams and update the respective component data and user data in respective databases or repositories available at the SE so that the updated component and user data can be used in determining the ranking and popularity of the multimedia streams and GUs during the Switching process.

A necessary component that may be included in every Style Model is a Sponsored Advertising attribute for a composite stream or SE. The sponsored advertising attribute may relate to a relevant sponsored content stored in a sponsored content database. In streams or SEs that will include sponsored content, STM is responsible for accessing the sponsored content database, identifying the sponsored content, coordinating the sponsored content intake, approving, matching, embedding and delivering the identified sponsored content within a composite stream. The sponsored content database may be integrated on the same server as the SE/FE or may be hosted on a remote storage device and made available to the SE/FE through the communication network. The STM can include all of these functions internally or work programmatically through an API with an appropriate sponsored content management system to access the sponsored content database.

The CUs of SE-created composite streams may include all the same options as with a single GU created stream in terms of feedback and interface options. In one embodiment, the LMSN operator has programmed specialized SE to create public composite channels for user interaction at any time (or for a specified period of time) based on inputs from interested users, such as a sponsor. For example, sponsored composite channels could be created by the LMSN Operator for specific brands, e.g. Coke, Ford, WSJ, ACLU, etc., based on the content of the multimedia streams, on the events being covered or the users being targeted.

In a Sponsored composite channel embodiment, an Advertiser could have direct input into selecting or staffing GU for the Advertiser's channel or they could entrust the LMSN to make appropriate matches for the Advertiser based upon a specification of campaign targets and goals. Based upon the feedback received from actual user interaction with advertisement content, branded channels can be optimized over time.

In one embodiment, the LMSN creates a series of public metric-based composite channels. These metric-based composite channels could be organized by GU or CU characteristics, topic, popularity or relevance. In another embodiment, a Re-Mixer Interface (RMI) is available for CU who intent to create their own composite streams. The RMI is basically an SE-programming tool that allows CUs to generate their own automated composites. In one embodiment, the SE is optimized to rank exclusively on real-time view count so that the resulting composite could be continuous from one GU or multiple GUs depending on actual network conditions at the time. At a game where CUs are furiously voting and GUs are trying to respond to CUs and keep their stream the most popular, this embodiment would increase network participation and traffic over time.

The FE displays available multimedia streams in an appropriate format based on the ranking criteria of the content in the multimedia streams. In one embodiment, the FE displays available multimedia streams in an MSI where the individual windows for each multimedia stream are individually sized based upon specified ranking criteria (user or LVFN operator). For example, the more popular a stream is (based upon the current and/or total-over-time CU interaction) the larger that window would be displaying that stream. Thus, the MSI of this embodiment would have windows of various sizes with the larger windows representing streams that more closely match the specified criteria, e.g. search query results present higher ranked feeds in larger windows, etc. Thus, the switching mechanism provides a tool to rank and prioritize multimedia streams from various GUs based on CUs request and users feedback so that the users may receive rich customized multimedia presentation that satisfies their needs and requirements.

III. Monetization Process:

The Monetization process provides a tool or mechanism through which content providers and users are able to generate revenue by including sponsored content along with the captured multimedia content and/or by promoting the multimedia content, events/topics and users. "Monetization," as used in this application, should be broadly construed to include the ability to target certain captured content to be associated with a sponsor, a "click-through" of images, or sponsored content, etc. Click-through, as used in this application, may include a count of viewers/consumers focusing on a particular GU or a particular capture zone. This count could be used as a metric that is analogous to navigation on a web page. Additionally, monetization may be associated with ratings from communities and users that are focusing on particular multimedia streams or matrices that define levels of monetization. For example: Higher rates may be charged or rewarded for higher access to the most popular multimedia content, or the most popular GUs due to a higher number of viewers for the particular multimedia content they generate. Monetization, thus, is to be broadly construed to define any algorithm, process, or agreement that can be established to couple together the viewing activity and interactivity associated with live multimedia streams between users and third parties that may wish to sponsor, pay for, or otherwise influence the content being captured by specific GUs or consumed by specific CUs.

The revenue thus generated may be fiscal, social, Network-based or currency-based, etc. The monetization process enables users such as advertisement companies, Mixers, GUs, CUs or any other interested users to provide revenue generating sponsorship to multimedia content using sponsored presentation, geo-targeting, behavioral targeting, popularity-based revenue sharing, real-world product placement and advertisement pack/surface management based on the content of multimedia presentation or events/topics being captured as well as based upon the associated users (capturing, mixing, re-publishing, sponsoring or consuming).

The monetization process enables automatic generation of composite stream in real-time by integrating promotional multimedia content with captured multimedia content based upon the attributes of the specific Users and content involved and a ranking of the current captured multimedia streams according to popularity and value. The captured media streams may be ranked using a ranking algorithm and may be based on the number of multimedia consuming users and their feedback for each stream including ways to cluster streams based upon popularity, location, subject content and user reactions. The monetization process encompasses multiple users and levels for promoting content including users such as CUs, GUs, Mixers, Advertisers, Sponsors, etc., and during feedback by CUs, GUs Mixers, during response from GUs, etc. and may include both automatic and manual generation of composite multimedia streams. The GUs, CUs and Mixers are registered users on the communication network having a monetization mechanism, so that the GUs, CUs and Mixers can be validated and identified during the promotion of multimedia content.

In one embodiment, the monetization process allows a Consuming User to sponsor customized/individualized streaming multimedia following a photostock-type model for streaming media. It is noted herein that the customized/individualized streaming multimedia may be generated for personal use or for commercial use. In both cases, the process for matching sponsored content to captured content is essentially the same. In the embodiment where the customized multimedia streams are created for commercial use, the CUs, upon customizing the streaming multimedia to fit the CU's requirements, may sponsor the customized/individualized multimedia in order to attract more viewer traffic. Alternatively, the monetization process may allow localized targeting incentive presentation of customized multimedia streams through distributed mobile networks, or may allow drop-in, real-time advertising based upon user feedback. Thus, the same stream captured in a single location may be bundled into multiple different composite streams depending upon the CUs location, preferences, market conditions, etc.

In one embodiment, the monetization process allows for sharing or assigning of revenue among GUs (multimedia capturers), producers, re-mixers and commentators in proportion to popularity among consuming users. The monetization process may also use the ranking algorithm (similar to the one defined in the switching process) to provide scaled revenue sharing amongst users (GUs, producers, re-mixers and commentators) based on prior history of each of the users (specific GU, CU, Mixer, Advertiser or any other user) that is currently interested in the content of the multimedia streams. In essence, each party to a revenue-share agreement for a stream will be apportioned either a static or dynamic percentage of either the revenue or profit generated by the monetization of the stream over time. These revenue sharing arrangements can be pre-arranged or arranged in real-time based upon user agreement to a set of ranges within which the revenue portions may slide depending on actual contribution.

In another embodiment, the monetization process allows for a GU to generate monetization (advertising) revenue based on the multimedia content captured. In this embodiment, the GU captures the multimedia content for a specific event/topic. The captured multimedia content includes one or more promotional media that the GU identifies as belonging to one of the revenue paying sponsors. The GU may have access to a list of advertisers/sponsors that are willing to pay advertising revenue for the promotional media captured by the capturing device. The list of advertisers/sponsors may be available locally to the GU or stored remotely on a remote storage device and may be accessed by the GU using communication network. The advertiser may be selected automatically by the Network operator without any input from the GU or selected by the GU using some form that provides limited to complete input as to the sponsored content and advertiser to be matched to their multimedia content for monetization. Different monetization models could be used for automatic or choice-based systems.

A system associated with receiving, aggregating and forwarding the multimedia content from the GU to the receiving devices integrates one or more promotional advertisements defined by the revenue producing sponsors with the corresponding promotional media to generate a composite multimedia stream. The integration of the promotional advertisements is performed by first identifying a location on a screen associated with receiving devices to place the promotional advertisement and then injecting corresponding one or more promotional advertisement in the identified location. A location could be a specific piece or portion of viewable screen or it could also be a portion or layer of the image sufficient to add the promotional content to the regular content to achieve the monetization objectives. The promotional advertisements enable the GU to generate monetization revenue for the promotional media. The composite multimedia stream is then presented at the receiving devices in substantial real-time. In one embodiment, the monetization revenue associated with the one or more promotional advertisements may be realized based on the number of viewers interested in the captured multimedia content. In another embodiment, the monetization revenue may be realized based on specific actions and interactions related to the promotional advertisements performed at the receiving devices, and in still yet another embodiment some combination of the above may be used.

Figure 17A:
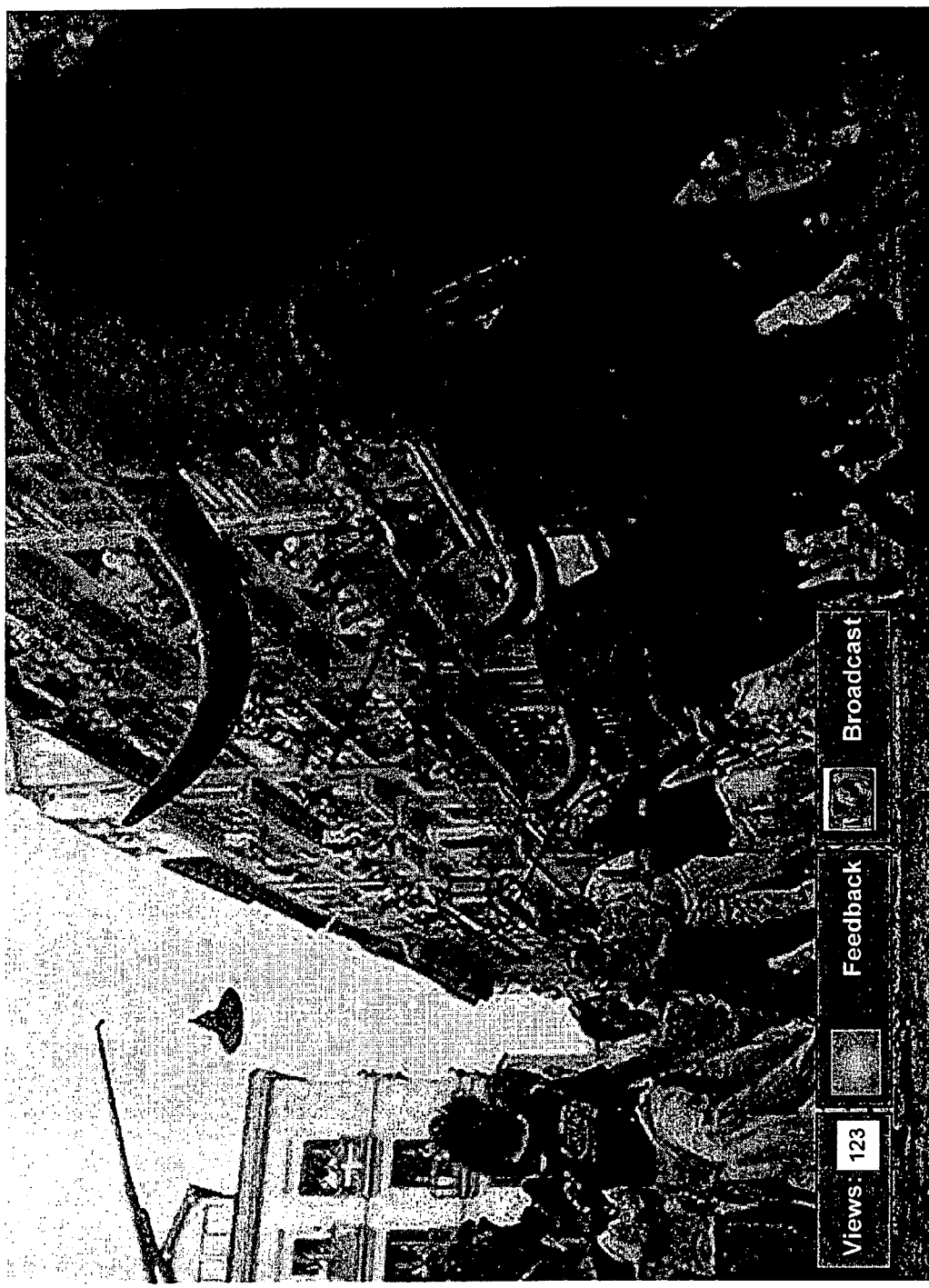
FIGS. 17A and 17B illustrate multimedia content captured by a capturing device that includes a promotional media for generating advertising revenue, in one embodiment of the invention.
Figure 17B:
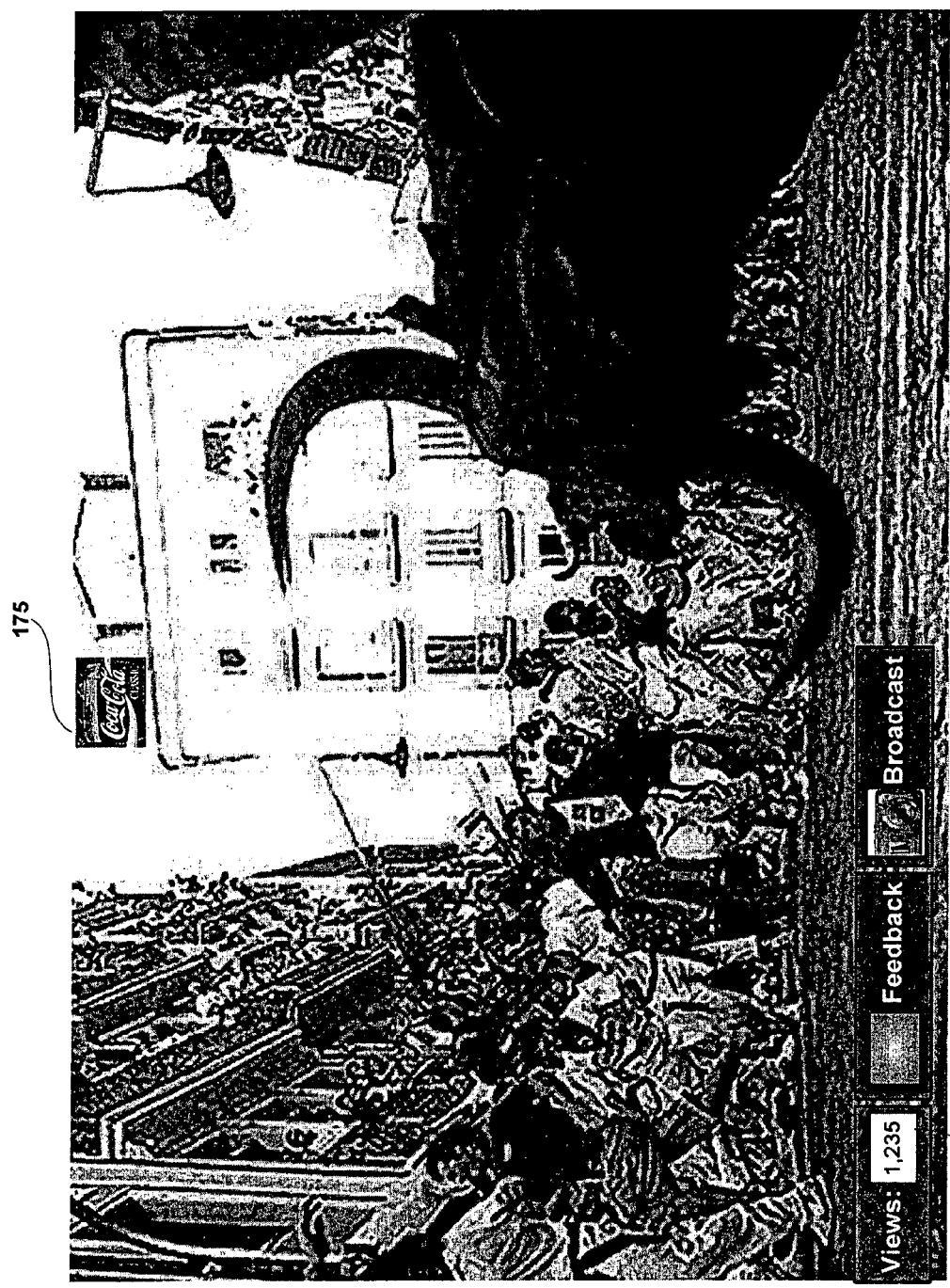

In another embodiment, the monetization revenue is realized based on a promotional media image, as illustrated in FIGS. 17A and 17B. In this embodiment, the multimedia content captured by the capturing devices includes an image 175 of a promotional media. The image 175 of a promotional media may be for a sponsored commercial product, such as Coke™ or for a service or Brand. The GU transmits the multimedia content with the promotional media to the receiving devices for rendering. The captured multimedia content from the GU may be part of a composite multimedia stream which may include multimedia streams from other capturing GUs and Mixers.

A system associated with receiving, aggregating and forwarding the multimedia content from the GU to the receiving devices determines the popularity of the captured multimedia content by tracking the number of consuming users 178 who choose the captured multimedia content for viewing at their respective receiving devices. In the embodiment illustrated in FIG. 17A, a total of 123 consuming users are viewing the captured multimedia content from the GU at 11:00 a.m. which does not contain the promotional media. The number of consuming users changes to 1,235 at 2:50 p.m., as shown in FIG. 17B for the multimedia content captured by the same GU that contains the promotional media.

The system further determines a period of time (between 2:50 p.m. and 3:50 p.m.) during which the image of promotional media is included in the captured multimedia content currently being rendered at the receiving devices and the corresponding popularity rating of the multimedia content during that time period. FIG. 18 illustrates a "Popularity vs. time" graph and a "promotional media vs. time" bar graph wherein bar 185 in the promotional media vs. time graph indicates the period of time the promotional media was shown in the captured multimedia content when the popularity of the multimedia content was at a peak. Although only one peak is shown and only one sponsor is tracked in this example, it is possible to have multiple peaks for multiple sponsors, as the captured content changes.

The system identifies a revenue generating algorithm associated with the promotional media and calculates the advertising revenue associated with the captured multimedia content based on the popularity of the multimedia content during the time period when the image of promotional media was present in the captured multimedia content. The calculated advertising revenue is assigned to the GU as an incentive for capturing the promotional media during an event/topic capture, is charged to the sponsored advertisers and may be shared with any other Network Users, e.g. mixers, voice talent, etc. as appropriate.

Figure 10:
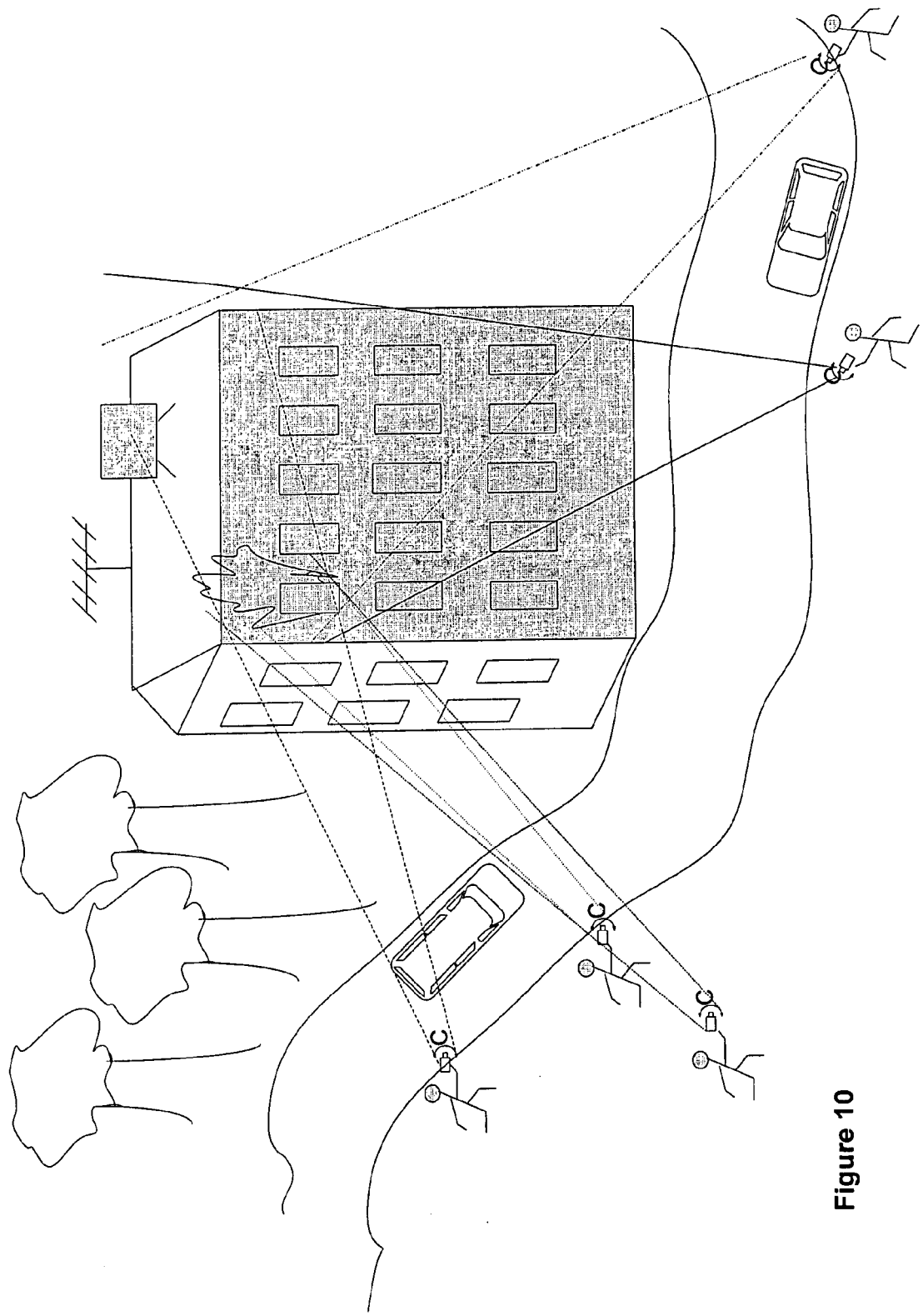
FIG. 10 illustrates an overview of a contextually related monetization scheme, in one embodiment of the invention.

Another aspect of the monetization process will now be explained in detail with reference to FIG. 10. The monetization process begins with a particular product/object/event/topic/people placement based upon real-world presence. An advertiser or sponsor may weigh-in on the product placement (promotional media) in the multimedia streams for generating revenue by including appropriate advertisements (ad) layers for advertising an existing product or to introduce new products or simply as part of a Brand advertising campaign. The ad placement and/or revenue generation could be scaled based on certain monetization criteria such as the placement of the product relative to the multimedia streams, sponsored angle of the product, static or dynamic clickable elements within the multimedia stream, amount of time the product is featured, popularity of the multimedia streams, type of event/ topic being captured by the multimedia stream, or the targeted audience, to name a few. The embodiment in FIG. 10, illustrates a sample ad generating event wherein an apartment complex with a product sign on the roof is being covered for a breaking news story of a fire in one of the floors.

In general, the real-time feedback to GUs and CUs could indicate these opportunities for monetization in the real world. Such real-time feedback can be sold to advertisers, product providers and other interested users to generate revenue. As the multimedia streams are viewed in real-time, the content producers or product providers can potentially insert promotional advertisement in virtual spaces within the streaming media. Such insertion of promotional advertisement are not restricted to content producers or product providers but may be performed by users such as GUs, CUs, Mixers, etc. Such advertisement layers may be contextual or non-contextual based advertisement.

In one embodiment of the invention, the promotional advertisements are interactive. The interactions of users on the CUs' devices are provided as user feedback to subscribing Advertisers in real-time so as to allow the Advertisers to increase, decrease or modify the appropriate promotional advertisements being placed. The promotional advertisement insertion may be customized based on specific user's taste, user's profile, location and regionalization, to name a few. The monetization process, thus, provides for new sponsoring opportunities to better distribute available funding to creative projects and smoother production-to-consumption pipeline for composite media, and allows sponsors immediate and dynamic access to talented multimedia content developers and remixers. By allowing the display of contextual ads within the multimedia based on content and user attributes, the ad can be customized to target specific set of users, topics, types of multimedia or events.

To aid in the monetization of multimedia content, the monetization process includes a monetization engine to identify specific surfaces within the multimedia streams at which to insert the advertisement layers based on information gathered from the promotional media associated with the multimedia streams/events/topics/subject/people. The monetization engine may include algorithms to detect potential monetization opportunities based on the gathered information and provide monetization tools to insert appropriate advertisements so that the sponsor or advertisers may be able to generate ad revenue. The algorithm may use historical data, Global Positioning System (GPS) technology and manual information-insertion to identify the surface or location in the media streams to insert sponsored ads, in the form of promotional advertisements, based on contextual information. The promotional advertisements may be directly integrated with the multimedia streams or may be referenced from an advertising database stored locally or remotely using Application Programming Interfaces (APIs). It is to be noted that the sponsored advertisements maybe in any form such as multimedia clips, audio, graphics, text, animation, etc., and are not restricted to the content of the multimedia streams. Additionally, the monetization engine may include logic to identify all users that have an interest in the advertisement, such as advertisers that have signed up for an ad campaign or paid sponsor members, etc. in order to allow placement/insertion/overlay of promotional advertisements to the multimedia streams, and in some embodiments, advertisers can bid against each other to win the right to be included in a specific stream. The monetization engine may be included within the infrastructure of a Live Media Feedback Mechanism and Network (LMFN) and may be used during feedback cycle or may be included within the Live Media Switching Network (LMSN) and may be used during the Switching cycle. LMFN infrastructure has been explained in great detail under the Discovery process and LMSN infrastructure has been explained in great detail under the Switching process and are therefore not covered in great detail in this section.

Once the promotional advertisement have been integrated with the multimedia streams, the monetization engine keeps track of the ad revenue generated by user interactions using the LMFN or LMSN based on how frequently the multimedia streams with the promotional advertisement are accessed or, in case of interactive advertisements, how many and how frequently and what ways, e.g. click, mouse-over, sign-up, etc., users have interacted with the promotional advertisement. The information gathered through the promotional advertisement is used by the monetizing engine to feedback to the users (CUs, GUs, Sponsors, Advertisers, etc.) through the FE. The feedback from the monetization engine may be in the form of advertisement revenues determined using a pre-defined revenue generating algorithm available to the monetization engine, based on the information gathered. Thus, the monetization process provides a mechanism for monetizing content of customized multimedia streams which can be used to attract more GUs, CUs, Advertisers and Sponsors.

Advantages of the various embodiments of the present invention are numerous. For instance, the streamlined real-time feedback mechanism enables low to no-cost multimedia production. The current embodiments allow for more personalized media consumption and revenue generation based on intuitive, dynamic and self-optimizing feedback/presentation. The process allows for a new community of talented multimedia GUs to provide the multimedia content by enabling discovery, presentation, and revenue generation amongst the talented user groups (individual as well as groups), a smoother production to consumption pipeline for composite media, as well as allowing the various users to interact socially. The discovery, presentation, and revenue-sharing with talented user groups (individual as well as group) are enabled through the LMFN, LMSN, and monetization engine (collectively called the LMN "Live Media Network"). The social aspect of LMN includes identifying talented GUs and CUs, teams of GUs and CUs and brokers and allowing for social interaction amongst such User groups and with interested sponsors, content producers, and agents while delivering a customized on-demand live multimedia stream based on Users preferences.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the invention. Accordingly, the present embodiments are to be considered as illustrative and not restrictive, and the invention is not to be limited to the details given herein, but may be modified within equivalents.

What is claimed is:

1. A method for processing multimedia content captured from a plurality of locations via one or more capturing devices, comprising:
   obtaining streams of multimedia content from one or more capturing devices, the capturing devices identifying a type of content being captured or location of capture, wherein the capturing devices are mobile capturing devices and the multimedia content captured by the capturing devices is of live content;
   enabling search of the multimedia content;
   presenting streams of the multimedia content conforming to the search at the receiving devices;
   enabling substantial real-time feedback from the receiving devices to one or more capturing devices that provide the streams of multimedia content, the substantial real-time feedback configured to influence actions taken by selected ones of the capturing devices during capture, wherein the real-time feedback includes votes used to influence actions at the capturing devices that serve to modify the streams of the multimedia content presented at the receiving devices; and
   aggregating the votes obtained from the receiving devices and communicating results from the aggregation to the capturing devices so as to influence modification of the stream captured by the capturing devices.

2. The method for processing multimedia content captured from a plurality of locations via one or more capturing devices of claim 1, wherein the capturing devices are configured to capture and transmit the multimedia content over a communication network and wherein the type of content includes content related to one of event, topic, people, location, time, activity, object, product, brand or service, the type of content identified through metadata provided by the capturing devices.

3. The method for processing multimedia content captured from a plurality of locations via one or more capturing devices of claim 1, wherein identifying location of capture is through one of a geo-locator mechanism associated with each of the capturing devices or metadata provided by the capturing devices.

4. The method for processing multimedia content captured from a plurality of locations via one or more capturing devices of claim 1, wherein enabling search further comprising:
   obtaining a search preference, the search preference identifying search criteria of a user interested in the multimedia content;
   identifying multimedia content available from the capturing devices based on the search preference; and
   organizing the identified multimedia content into a plurality of related indices, the organizing of the multimedia content is by indexing, ranking, and ordering the multimedia content based on a ranking algorithm and the search preference.

5. The method for processing multimedia content captured from a plurality of locations via one or more capturing devices of claim 4, wherein presenting the multimedia streams further including:
   filtering the organized multimedia content iteratively based on context of the multimedia content and the search preference;
   formatting the filtered multimedia content based on presentation criteria for the receiving devices, and
   providing access to the formatted multimedia content to the receiving devices, the access allowing rendering of the multimedia content on the receiving devices based on the presentation criteria.

6. The method for processing multimedia content captured from a plurality of locations via one or more capturing devices of claim 5, wherein the search preference includes any one or combination of consuming user preferences, preferences associated with hardware of receiving devices, location of the receiving device, network-affiliation of the receiving devices, demographic, and subscriber status.

7. The method for processing multimedia content captured from a plurality of locations via one or more capturing devices of claim 1, wherein enabling feedback further comprising:
   capturing an action, an interaction or a communication event on each of the receiving devices, the actions, interactions and communications identifying the user feedback related to the multimedia content in substantial real-time; and
   organizing the captured feedback from the receiving devices into a plurality of related indices associated with the event and users, the organizing of the feedback is by aggregating, filtering, summarizing, arbitrating and transcoding the feedback, the organized feedback presented at the capturing devices so as to effectively influence actions taken at the capturing devices.

8. The method for processing multimedia content captured from a plurality of locations via one or more capturing devices of claim 7, wherein the substantial real-time feedback between the receiving devices and capturing devices is by one of direct interaction or interaction through a feedback engine, the interaction being synchronous or asynchronous.

9. The method for processing multimedia content captured from a plurality of locations via one or more capturing devices of claim 1, wherein enabling substantial real-time feedback further including coordinating requests from consuming users, the coordination of requests comprising:
   receiving requests from one or more consuming users for multimedia content for a specific event or topic, the request identifying the location of capture;

identifying a set of capturing devices associated with one or more generating users to service the request, wherein the capturing devices are located at one of the location of capture or location substantially close to the location of capture;

facilitating a substantial real-time communication call to the generating users associated with the identified set of capturing devices; and communicating the response from the generating users associated with the identified set of capturing devices to the consuming users in response to the request, in substantial real-time.

10. The method for processing multimedia content captured from a plurality of locations via one or more capturing devices of claim 1, wherein the multimedia content captured by the capturing devices are dynamically updated in substantial real-time, and wherein the feedback obtained from the consuming users is dynamically changing in substantial real-time.

11. The method for processing multimedia content captured from a plurality of locations via one or more capturing devices of claim 1, wherein the multimedia content includes metadata for providing pertinent information related to multimedia content and the capturing device associated with the multimedia content, the multimedia content may be one of text, audio, video, vibrations, graphics, or any combinations thereof.

12. A method for managing multimedia content capture and access, comprising:

obtaining streams of multimedia content from one or more capturing devices, the capturing devices identifying a type of content being captured or location of capture, wherein the capturing devices are mobile capturing devices and the multimedia content captured by the capturing devices is of live content;

obtaining an interest type for multimedia content from a consuming user;

searching the multimedia content for a subset of multimedia content based on the interest type of the consuming user;

presenting the searched subset of the multimedia content to receiving devices;

obtaining feedback regarding the one or more multimedia content from consuming users that have access to the receiving devices, wherein the feedback includes votes used to influence actions at the capturing devices that serve to modify the streams of the multimedia content presented at the receiving devices; and aggregating the votes obtained from the receiving devices and communicating results from the aggregation to the capturing devices to influence actions to be taken at the one or more capturing devices during capturing of multimedia content in substantial real-time, the influenced actions serving to modify the one or more multimedia content captured by the capturing devices in substantial real time.

13. The method for managing multimedia content capture and access of claim 12, wherein searching the multimedia content further comprising:

identifying a subset of multimedia content from the multimedia content captured by the capturing devices based on the interest type of the consuming user, wherein the multimedia content captured by the capturing devices is dynamically updated in substantial real-time; and organizing the identified subset of multimedia content into a plurality of indices by indexing, ranking, ordering and filtering the subset of multimedia content based on a ranking algorithm and the interest type of consuming user.

14. The method for managing multimedia content capture and access of claim 13, wherein presenting the searched subset of the multimedia content further including:

identifying the appropriate subset of multimedia content for the consuming user;

formatting the multimedia content based on presentation criteria associated with a receiving device of the consuming user; and providing access to the formatted subset of multimedia content to the receiving device, the multimedia content in the formatted subset defining the interest type of the consuming user.

15. The method for managing multimedia content capture and access of claim 12, wherein obtaining feedback further comprising:

capturing actions, interactions or communication events from the receiving device, the actions, interactions and communications identifying the user feedback related to the subset of multimedia content presented at the receiving device; and organizing the captured feedback from the receiving devices into respective indices associated with the respective event and users by aggregating, filtering, summarizing, arbitrating and transcoding, wherein the feedback obtained from the consuming users is dynamically changing in substantial real-time based on the multimedia content presented.

16. The method for managing multimedia content capture and access of claim 12, wherein communicating feedback further comprising:

identifying the appropriate feedback index associated with the capturing devices;

presenting the organized feedback from the identified feedback index at the capturing devices in substantial real-time so as to influence future capture content.

17. A method for managing interactive multimedia content, the method comprising:

receiving streams of multimedia content at a feedback engine, the multimedia content obtained from capturing devices associated with one or more generating users, each of the capturing devices communicatively connected to the feedback engine and configured to capture and transmit the multimedia content in substantial real-time over a communication network, wherein the capturing devices are mobile capturing devices and the multimedia content captured by the capturing devices is of live content;

processing the multimedia content by the feedback engine;

providing access to the multimedia content, the access being provided to receiving devices of consuming users in substantial real-time, each of the receiving devices being in communication with the feedback engine over the communication network, wherein the capturing devices operate independent of the receiving devices;

receiving feedback about or from one or more of the consuming users, the feedback being processed by the feedback engine in substantial real-time, wherein the feedback includes votes used to influence actions at the capturing devices that serve to modify the streams of multimedia content captured by the capturing devices, wherein the votes are aggregated and results from the aggregation communicated to the capturing devices so as to influence modification of the stream captured by the capturing devices; and presenting certain multimedia content to the receiving devices based on search preference, such that each of the consuming users is presented with a dynamically changing subset of the plurality of multimedia content based on changes in content obtained from the plurality of capturing devices and based on the search preference.

18. The method for managing interactive multimedia content of claim 17, wherein processing the multimedia content by the feedback engine further comprising:
receiving the multimedia content captured by the capturing devices in substantial real-time; and
organizing the multimedia content into a plurality of indices by indexing, ranking, ordering and filtering the multimedia content based on a ranking algorithm and the content type of the captured multimedia.

19. The method for managing interactive multimedia content of claim 17, wherein providing access to the receiving devices further comprising:
receiving search preference for the multimedia content from the consuming users;
identifying a subset of organized multimedia content based on the search preference of each of the consuming users;
formatting the organized subset of multimedia content based on presentation criteria of each of the receiving devices and the search preference of each of the consuming users; and
presenting the formatted subset of multimedia content specific to each of the consuming users at the respective receiving devices in substantial real-time,
wherein the multimedia content is dynamically changing.

20. The method for managing interactive multimedia content of claim 17, wherein receiving feedback from the receiving devices further comprising:
capturing actions, interactions and communication events at each of the receiving devices in substantial real-time, the captured actions, interactions and communication events identifying consuming users feedback related to or about the multimedia content; and
organizing the feedback into plurality of indices by aggregating, filtering, summarizing, arbitrating and transcoding the feedback; and
presenting the appropriate organized feedback to the respective capturing devices to effectuate actions taken at the capturing devices.

21. The method for managing interactive multimedia content of claim 20, wherein presenting certain multimedia content to the receiving devices further comprising:
updating a plurality of related indices associated with the event and users of the multimedia content based on the appropriate feedback from the consuming users, the updating of the indices redefining the ranking and priority of the multimedia content;
identifying the multimedia content captured by the capturing devices based on the search preference and the redefined ranking and priority to determine certain multimedia content that fits the search preference;
organizing the multimedia content by indexing, ordering, ranking and filtering based on the search preference and presentation criteria; and
presenting the multimedia content to the receiving devices.

22. A system for managing interactive multimedia content, the system comprising:
a plurality of capturing devices handled by one or more generating users, each of the plurality of capturing devices configured to capture and transmit streams of multimedia content in substantial real-time over a communication network, wherein the plurality of capturing devices are mobile capturing devices and the multimedia content captured by the capturing devices is of live content;
a plurality of receiving devices associated with one or more consuming users, each of the plurality of receiving devices configured to receive the multimedia content in substantial real-time over the communication network and to provide feedback in substantial real-time, wherein the plurality of capturing devices operate independent of the receiving devices, wherein the real-time feedback includes votes used to influence actions at the capturing devices that serve to modify the streams of the multimedia content transmitted to the receiving devices; and
a feedback engine communicatively connected to the plurality of capturing devices and the plurality of receiving devices, the feedback engine including a stream management module and a feedback management module, wherein the stream management module is configured to process requests and multimedia content by at least one of validating, retrieving, indexing, formatting or presenting multimedia content to the receiving devices based on search preference and the feedback management module is configured to instrument rendering of multimedia content at the receiving devices, and at least one of gathering, reviewing, indexing, prioritizing or publishing feedback to the appropriate capturing devices to influence actions to be taken at selected ones of capturing devices, such that each of the receiving devices is presented with a dynamically changing subset of the multimedia content based on changes in content obtained over time from the plurality of capturing devices and based on the search preference, wherein gathering of feedback further includes aggregating the votes obtained from the receiving devices, and publishing of feedback further includes communicating results from the aggregation to the capturing devices so as to influence modification of the stream captured by the capturing devices.

23. The system for managing interactive multimedia content of claim 22, wherein the stream management module and the feedback management module are configured such that the stream management module and feedback management module are either integrated into a single feedback engine and executed concurrently or located in separate feedback engines that run complementary to each other, wherein the capturing devices further include a geo-locator mechanism to identify a location of capture of the multimedia content.

24. The system for managing interactive multimedia content of claim 22, wherein each of the plurality of capturing devices further including,
a) controls for capturing and transmitting multimedia content, wherein the capturing devices controls are defined through one of software or hardware;
b) a storage device to store the captured multimedia content and metadata associated with the multimedia content and Users for subsequent retrieval, the storage device available locally or remotely, wherein the remote storage device is accessed over the communication network, and
wherein, each of the plurality of receiving devices further including,
a) controls for receiving and providing feedback to multimedia content, wherein the receiving devices controls are defined through one of software or hardware;
b) a storage device to store the multimedia content and feedback associated with the multimedia content and Users for subsequent retrieval, the storage device available locally or remotely, wherein the remote storage device is accessed over the communication network.

25. A non-transitory computer readable storage medium storing program instructions for operating a computing system to process multimedia content captured from a plurality of locations via one or more capturing devices, comprising:

program instructions for obtaining streams of multimedia content from one or more capturing devices, the capturing devices identifying a type of content being captured or location of capture, wherein the capturing devices are mobile capturing devices and the multimedia content captured by the capturing devices is of live content;

program instructions for enabling search of the multimedia content;

program instructions for presenting streams of the multimedia content conforming to the search, the presenting being for at the receiving devices;

program instructions for enabling substantial real-time feedback from the receiving devices to one or more capturing devices that provide the streams of multimedia content, the substantial real-time feedback configured to influence actions taken by selected ones of the capturing devices during capture, wherein the real-time feedback includes votes used to influence actions at the capturing devices that serve to modify the streams of the multimedia content presented at the receiving devices; and program instructions for aggregating the votes obtained from the receiving devices and communicating results from the aggregation to the capturing devices so as to influence modification of the stream by the capturing devices.

* * * * *